US011878436B2

(12) United States Patent
Antoniou et al.

(10) Patent No.: US 11,878,436 B2
(45) Date of Patent: Jan. 23, 2024

(54) SHAVING AID ADAPTOR FOR A SHAVING CARTRIDGE

(71) Applicant: BIC-VIOLEX SA, Attiki (GR)

(72) Inventors: Zoi Antoniou, Keratea-attica (GR); Ioannis Bozikis, Koukaki-Athens (GR); Dimitrios Efthimiadis, Nea Kypseli (GR); Georgios Georgakis, Melisia (GR); Panagiotis Giannopoulos, Illion (GR); Maria Petratou, Marousi-Athens (GR); Ioannis-Marios Psimadas, Vrilissia-Athens (GR); Panagiotis Zafiropoulos, Wallingford, CT (US)

(73) Assignee: BIC-VIOLEX SA, Anixi (GR)

( * ) Notice: Subject to any disclaimer, the term of this patent is extended or adjusted under 35 U.S.C. 154(b) by 294 days.

(21) Appl. No.: 17/202,838

(22) Filed: Mar. 16, 2021

(65) Prior Publication Data

US 2021/0206009 A1 Jul. 8, 2021

Related U.S. Application Data

(63) Continuation of application No. 16/716,394, filed on Dec. 16, 2019, now Pat. No. 10,974,402, which is a continuation of application No. 15/982,208, filed on May 17, 2018, now Pat. No. 10,549,437, which is a continuation of application No. 14/895,956, filed as application No. PCT/EP2013/061459 on Jun. 4, 2013, now Pat. No. 9,999,980.

(51) Int. Cl.
*B26B 21/44* (2006.01)
*B26B 21/40* (2006.01)

(52) U.S. Cl.
CPC ........ *B26B 21/443* (2013.01); *B26B 21/4081* (2013.01); *B26B 21/44* (2013.01)

(58) Field of Classification Search
None
See application file for complete search history.

(56) References Cited

U.S. PATENT DOCUMENTS

| | | | |
|---|---|---|---|
| 2,677,883 | A | 5/1954 | Schallgruber |
| 3,969,817 | A | 7/1976 | DiBuono |
| 4,074,429 | A | 2/1978 | Roberts |
| 5,036,587 | A | 8/1991 | Trotta et al. |
| 5,384,961 | A | 1/1995 | Gregory |
| 6,996,908 | B2 | 2/2006 | Orloff et al. |
| 7,540,088 | B2 | 6/2009 | Takeshita |
| 7,703,361 | B2 | 4/2010 | Johnson et al. |
| 7,877,879 | B2 | 2/2011 | Nakasuka |
| 8,011,101 | B2 | 9/2011 | Coffin et al. |
| 8,037,609 | B2 | 10/2011 | Nicoll |
| 8,061,039 | B2 | 11/2011 | Kwiecien et al. |

(Continued)

FOREIGN PATENT DOCUMENTS

| | | | |
|---|---|---|---|
| EP | 1 935 588 | A1 | 6/2008 |
| EP | 2 078 593 | A1 | 7/2009 |

(Continued)

*Primary Examiner* — Hwei-Siu C Payer
(74) *Attorney, Agent, or Firm* — POLSINELLI PC

(57) ABSTRACT

An adaptor is provided for a shaving cartridge. The adaptor includes a frame extending along a longitudinal axis and a shaving aid coupled with the frame. The adaptor is configured to be reversibly mountable on a shaving cartridge perpendicular to the longitudinal axis.

16 Claims, 18 Drawing Sheets

(56) References Cited

U.S. PATENT DOCUMENTS

| | | | |
|---|---|---|---|
| 8,327,546 B2 | 12/2012 | Tucker et al. | |
| 8,407,900 B2 | 4/2013 | Johnson | |
| 9,434,080 B2 | 9/2016 | Bozikis | |
| 9,517,570 B2 | 12/2016 | Tucker et al. | |
| 9,999,980 B2 | 6/2018 | Antoniou et al. | |
| 10,549,437 B2 | 2/2020 | Antoniou et al. | |
| 10,974,402 B2 * | 4/2021 | Antoniou | B26B 21/443 |
| 11,000,962 B2 * | 5/2021 | Antoniou | B26B 21/443 |
| 11,224,983 B2 * | 1/2022 | Bozikis | B26B 21/4031 |
| 11,400,610 B2 * | 8/2022 | Moustakas | B26B 21/4037 |
| 2008/0209734 A1 * | 9/2008 | Nicoll | B26B 21/44 30/41 |
| 2008/0256800 A1 | 10/2008 | Nicoll | |
| 2008/0256802 A1 | 10/2008 | O'Connor et al. | |
| 2009/0307908 A1 | 12/2009 | Nakasuka | |
| 2010/0154220 A1 | 6/2010 | Nakasuka | |
| 2012/0102741 A1 * | 5/2012 | Pesikov | B26B 21/44 30/41 |
| 2012/0151772 A1 | 6/2012 | Moon et al. | |
| 2013/0199346 A1 | 8/2013 | Psimadas et al. | |
| 2014/0245612 A1 | 9/2014 | Good et al. | |
| 2014/0366380 A1 | 12/2014 | Good | |
| 2015/0107114 A1 | 4/2015 | Minsk et al. | |
| 2015/0158191 A1 | 6/2015 | Jeong et al. | |
| 2016/0129603 A1 | 5/2016 | Antoniou et al. | |
| 2020/0114533 A1 | 4/2020 | Antoniou et al. | |
| 2020/0114534 A1 | 4/2020 | Antoniou et al. | |
| 2021/0206009 A1 * | 7/2021 | Antoniou | B26B 21/4081 |

FOREIGN PATENT DOCUMENTS

| | | | |
|---|---|---|---|
| WO | 2012/028413 A1 | 3/2012 |
| WO | WO 2016/040549 A1 * | 3/2016 |

* cited by examiner

SHAVING AID ADAPTOR FOR A SHAVING CARTRIDGE

This application is a continuation application of U.S. application Ser. No. 16/716,394, filed Dec. 16, 2019, which issued as U.S. Pat. No. 10,974,402 on Apr. 13, 2021, which is a continuation application of U.S. application Ser. No. 15/982,208, filed May 17, 2018, which issued as U.S. Pat. No. 10,549,437 on Feb. 4, 2020, which is a continuation application of U.S. application Ser. No. 14/895,956, filed Dec. 4, 2015, which issued as U.S. Pat. No. 9,999,980 on Jun. 19, 2018, which is a national stage application of International Application No. PCT/EP2013/061459, filed Jun. 4, 2013, the entire contents of each are incorporated herein by reference.

FIELD OF INVENTION

The embodiments of the present invention relates to an adaptor for shaving cartridges, to shaving assemblies that include a cartridge and an adaptor, to a razor that has a razor handle and such an assembly and to a method of shaving.

BACKGROUND OF THE INVENTION

The embodiments of the invention is relate to a shaving cartridge and a shaving razor having a shaving aid directly attached on the shaving cartridge.

Such razors avoid the use of shaving preparation like shaving foam, gel or cream to be put on the skin before shaving. Besides, such shaving aid provided directly on the shaving cartridge allows shaving within a wet shaving environment, for instance, within a shower where a shaving preparation will be immediately removed by the water before the surface can be shaved.

Therefore, shaving cartridges have been provided with additional shaving aids attached on the shaving cartridge in order to improve the shaving.

However, the shaving cartridges provided with additional shaving aids are connected permanently to the shaving aids. As a result, when the shaving aid is outworn while the shaving blades are not dulled the entire shaving cartridge (with the additional shaving aid) needs to be thrown unless the shaving is to be achieved degraded.

Therefore, the known shaving cartridges do not allow shaving in good conditions as soon as the shaving aid is outworn unless changing the entire shaving cartridge. In addition, the user is given the option to remove one or more of the shaving aids, for instance when precision is needed or for hygiene reasons.

SUMMARY OF THE EMBODIMENTS OF THE PRESENT INVENTION

To this aim, it is provided an adaptor for a shaving cartridge, wherein the adaptor is provided with at least one shaving aid, and wherein the adaptor is slidably mountable on a shaving cartridge having one or more shaving blades, each of shaving blades being provided with a cutting edge.

To this aim, it is provided an adaptor for a shaving cartridge, wherein the adaptor is provided with at least one shaving aid, and wherein the adaptor is reversibly mountable on a shaving cartridge having one or more shaving blades, each of shaving blades being provided with a cutting edge.

To this aim, it is provided an adaptor for a shaving cartridge, wherein the adaptor comprises a frame which is provided with at least one shaving aid, wherein the adaptor is mountable on a shaving cartridge having one or more shaving blades, each of shaving blades being provided with a cutting edge and wherein the at least one shaving aid is reversibly mounted on the frame.

The reversibility of the adaptor of the present invention can be with regard to a plane, (the shaving aid is reversed by rotation about an axis perpendicular to that plane), whereas it can also mean with regard to an axis contained in that plane (the shaving aid is reversed by rotation about an axis contained in that plane).

When the reversibility is made in a plane (for instance, the plane containing the cutting edges), the at least one shaving aid location will change with regard to the position of the cutting edge. More precisely, when the shaving aid is located forwardly in front of the cutting edges, after being reversed it will be located rearwardly the cutting edges. This means that the same surface of the shaving aid is used for shaving; it is just its location with regard to the blades that changes.

When the reversibility is made perpendicular to a plane (for instance, the plane containing the cutting edges), the at least one shaving aid location will not change with regard to the position of the cutting edge. More precisely, when the shaving aid is located forwardly in front of the cutting edges, after being reversed it will still be located forwardly the cutting edges. This means that an opposite surface of the shaving aid is used for shaving; the shaving aid has in that case preferably a first face and an opposed second face.

The adaptor of the embodiments of the present invention thus allows a further use of a shaving cartridge when the shaving aid is outworn.

In various embodiments of the present invention, one and/or the other of the following features may be incorporated in this adaptor alone or in mutual combination:

the adaptor is adapted to be slidably mountable and/or mountable by snap-fit or by encasing on a shaving cartridge having one or more shaving blades, each of shaving blades being provided with a cutting edge.

further comprising a frame, the frame having a first wall, a second wall opposed to the first wall, a side wall extending from the first wall to the second wall, a first end and an opposed second end, the first wall having a first opening, wherein the frame is mountable on a shaving cartridge such that the cutting edge of the one or more shaving blades is uncovered and is accessible through the first opening for shaving; in that case, the second wall of the frame may have a second opening and the frame might be mountable on a shaving cartridge such that the cutting edge of the one or more shaving blades is uncovered and is accessible through either the first opening or the second opening; besides, the frame might comprise two parts connected by a hinge; besides, the first end might have a first end opening and the frame is able to be slidably mountable on a shaving cartridge through the first end opening.

the adaptor is adapted to frictionally receive the shaving cartridge.

the adaptor is releasably mountable on the shaving cartridge.

the adaptor is elastically mountable on the shaving cartridge.

the at least one shaving aid has a shaving aid body comprising a lubricant, a moisturizer, a conditioner and/or an exfoliant.

the adaptor further comprises at least one shaving aid holder configured to hold the at least one shaving aid, and especially the shaving aid body.

further comprising a frame, wherein the at least one shaving aid is releasable with regard to the frame.

further comprising a frame, wherein the at least one shaving aid is motionless with regard to the frame.

The embodiments of the present invention also concern a shaving assembly comprising a shaving cartridge having one or more shaving blades, each of shaving blades being provided with a cutting edge and an adaptor, wherein the adaptor is mountable on the shaving cartridge and wherein the at least one shaving aid extends outwardly with regard to the shaving cartridge when the adaptor is mounted on the shaving cartridge.

The embodiments of the present invention also concern a razor comprising a razor handle and such a shaving assembly, wherein the shaving assembly is provided with connecting means for connecting the shaving assembly to the razor handle.

The embodiments of the present invention also concern a method of shaving with such a razor according, wherein the shaving aid is changed and/or is reversed on the shaving cartridge when outworn while the razor handle and the shaving head are kept.

BRIEF DESCRIPTION OF THE DRAWINGS

Other characteristics and advantages of the present invention will readily appear from the following description of one embodiment, provided as non-limitative examples, in reference to the accompanying drawings.

In the drawings.

On the different Figures, the same reference signs designate identical or similar elements.

DETAILED DESCRIPTION OF THE INVENTION

Figure 1A:
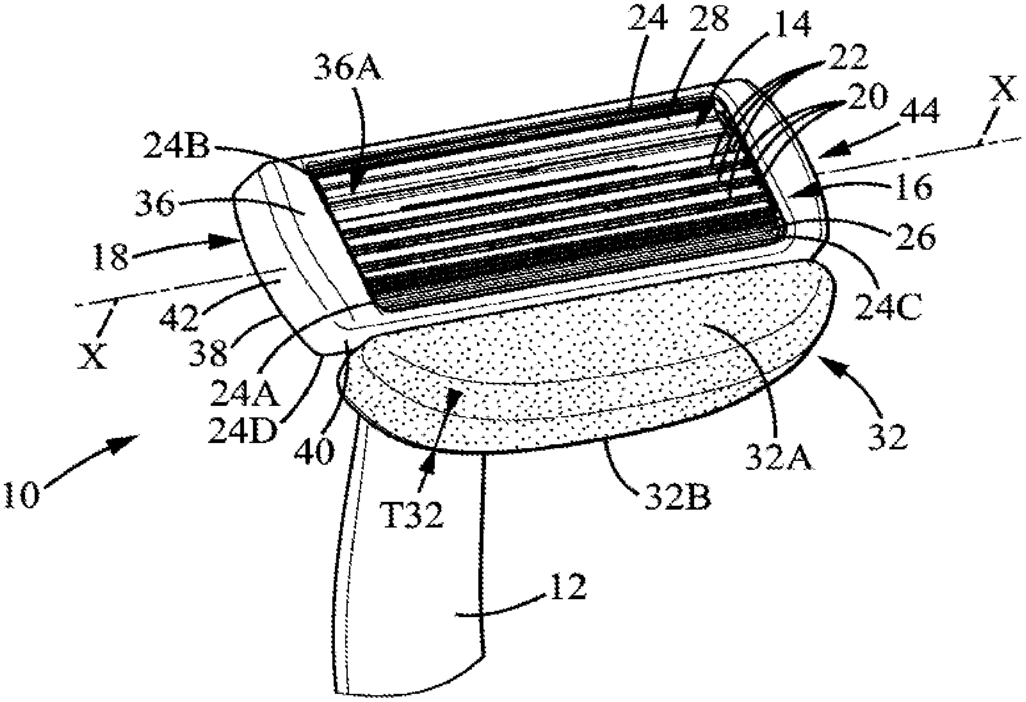
FIG. 1A is a perspective view of an adaptor according to the present invention connected to a shaving cartridge itself connected to a handle body.

FIGS. 1A, 2A, 3A, 4A, 5A and 9A illustrate a wet razor 10 according to the present invention, comprising a razor handle 12, a shaving cartridge 14 and an adaptor 16 which can be connected to the shaving cartridge 14 as illustrated on the Figures such to form a shaving assembly 18.

Figure 3A:
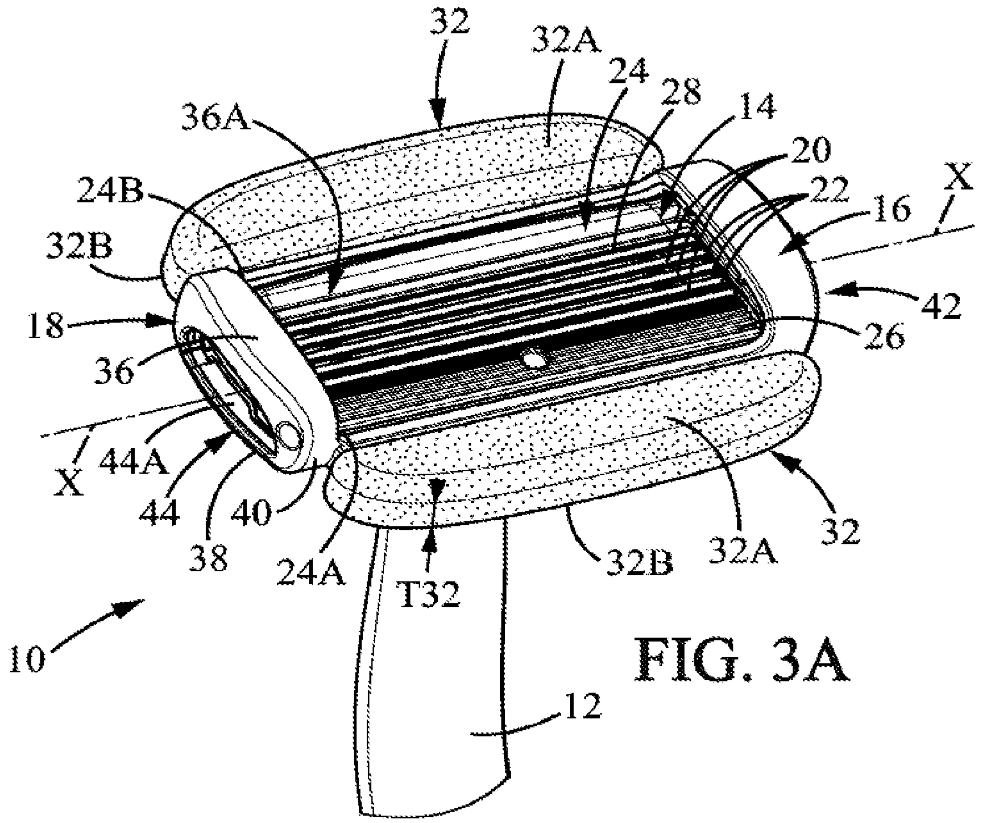
FIG. 3A is a perspective view of an adaptor according to another embodiment connected to a shaving cartridge itself connected to a handle body.
Figure 3B:
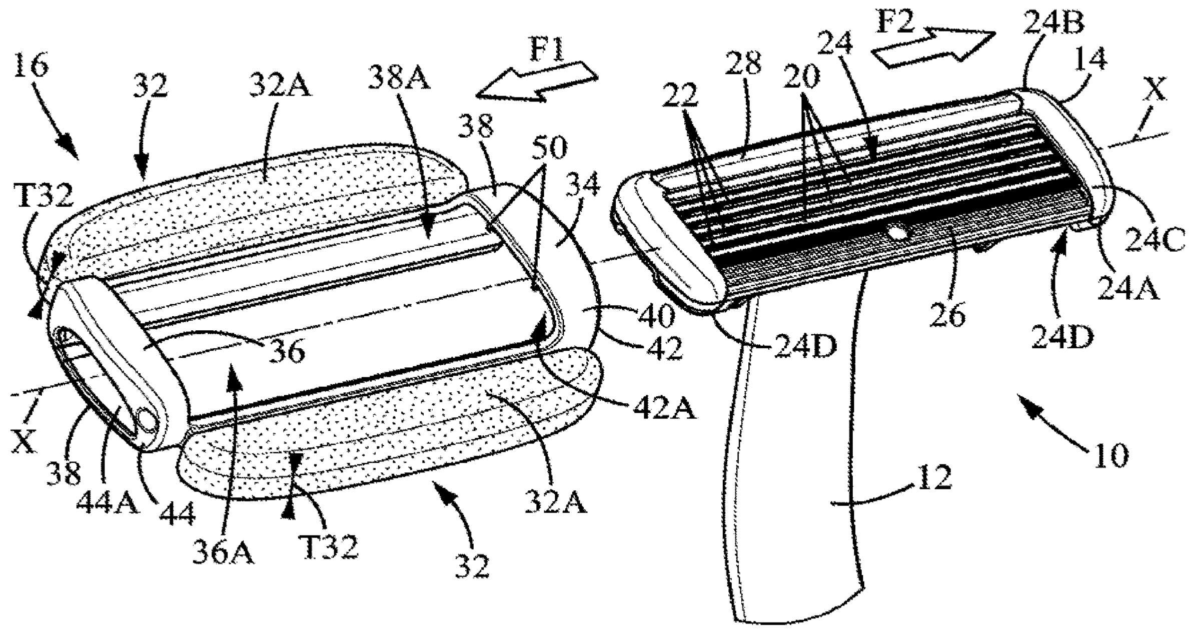
FIG. 3B is a perspective view of the razor of FIG. 3A, illustrating the method of attaching/detaching the adaptor of FIG. 3A from the shaving cartridge.
Figure 4A:
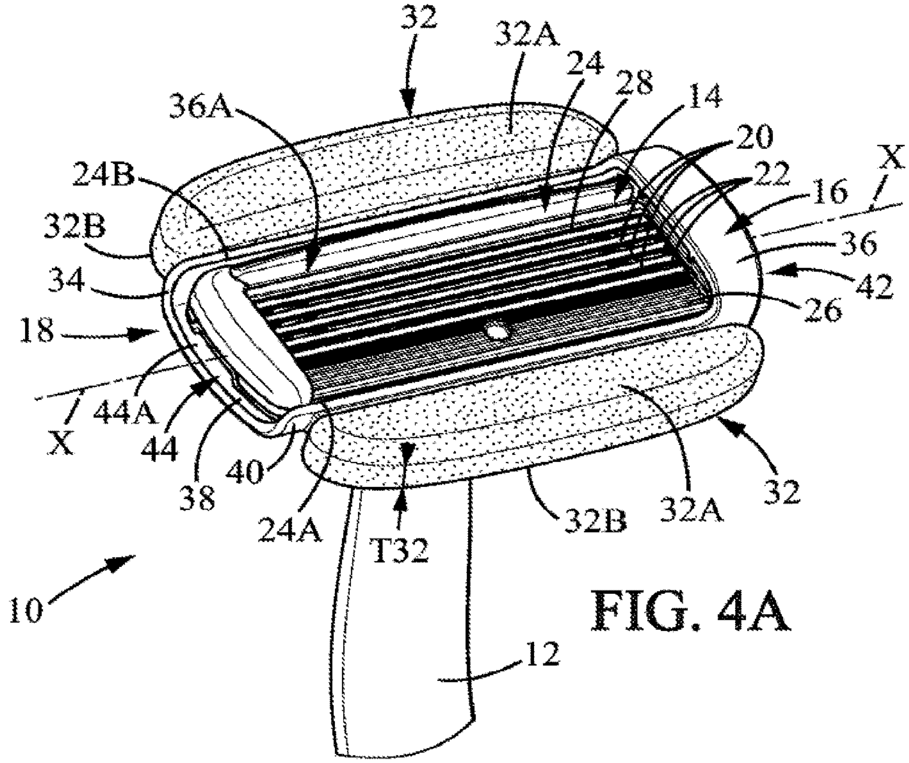
FIG. 4A is a perspective view of an adaptor according to another embodiment connected to a shaving cartridge itself connected to a handle body.
Figure 4B:
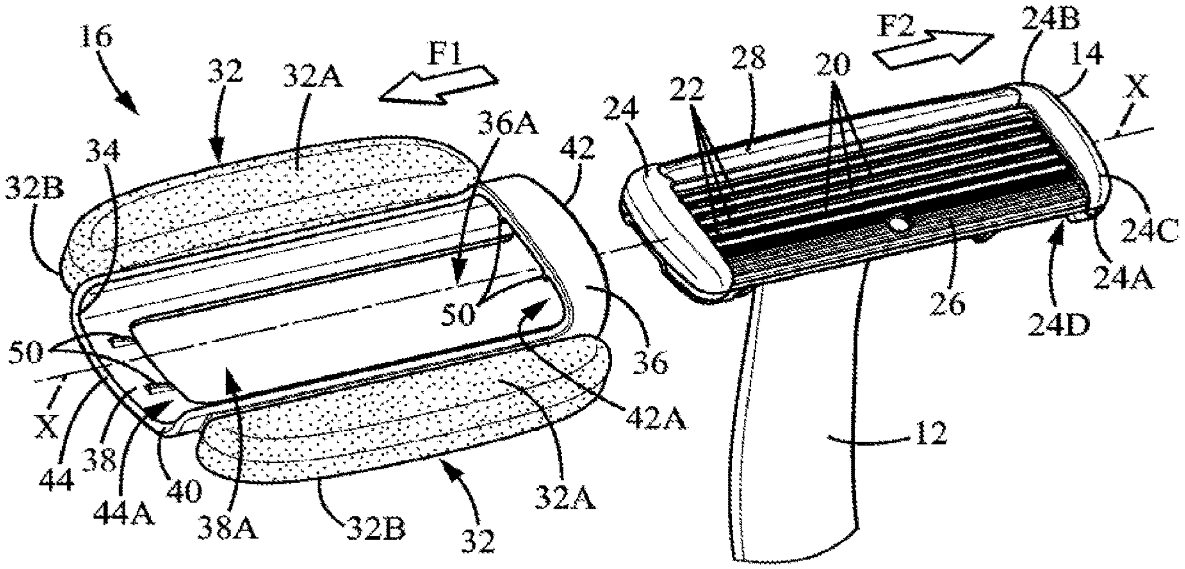
FIGS. 4B-4F are perspective views of the razor of FIG. 4A, illustrating the method of attaching/detaching the adaptor of FIG. 4A from the shaving cartridge.
Figure 4C:
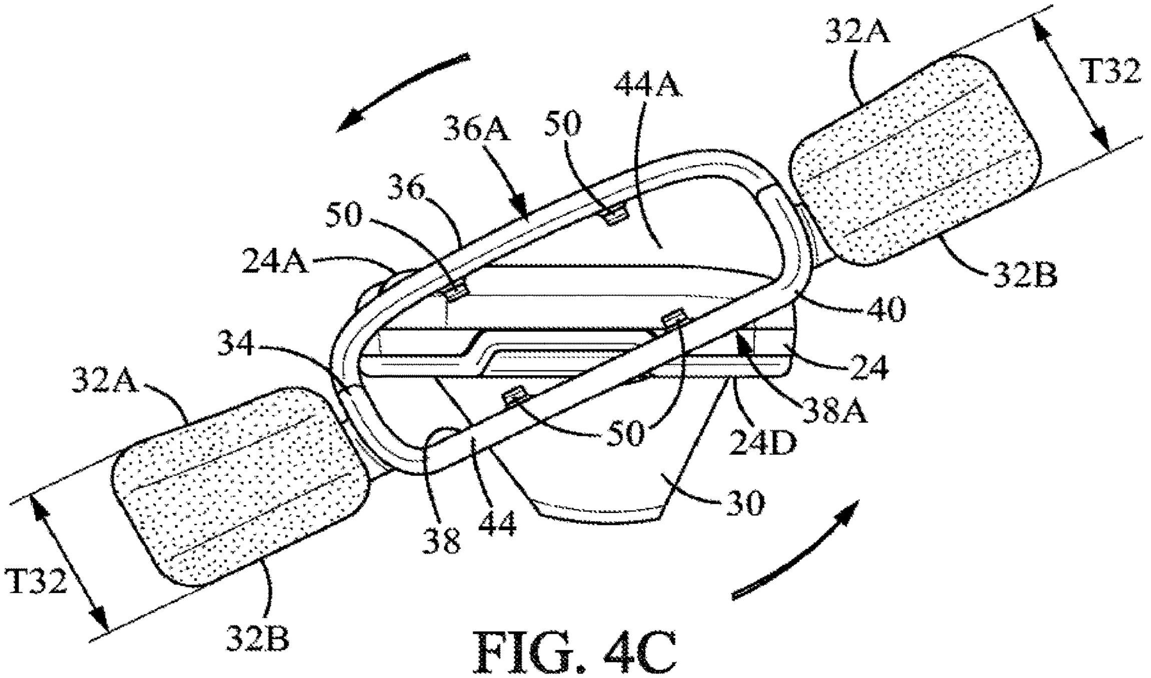
Figure 4D:
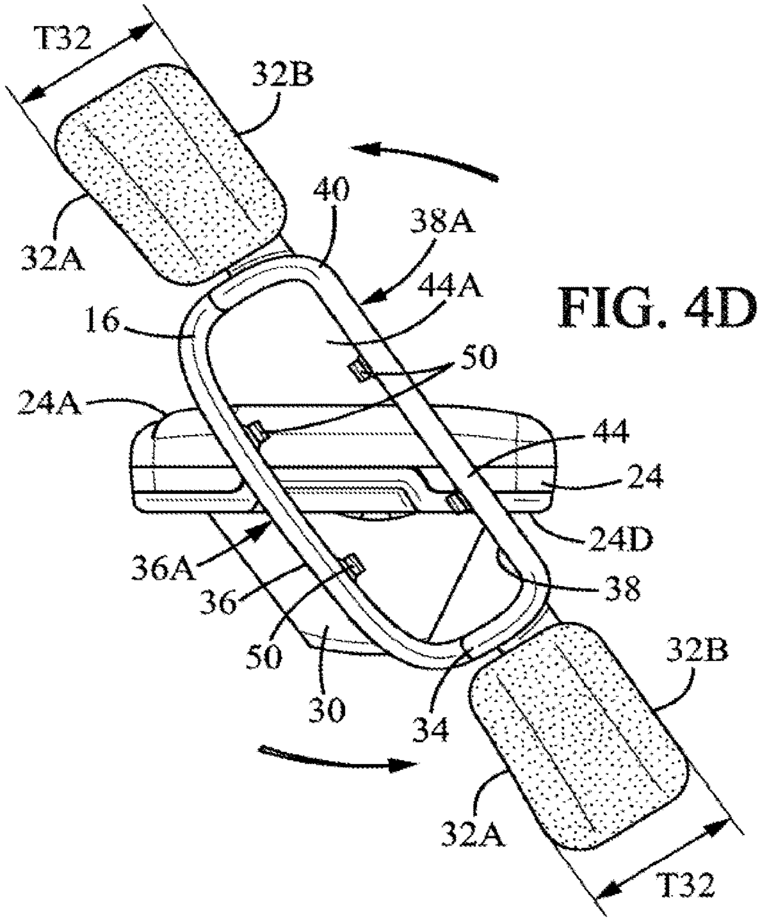
Figure 4E:
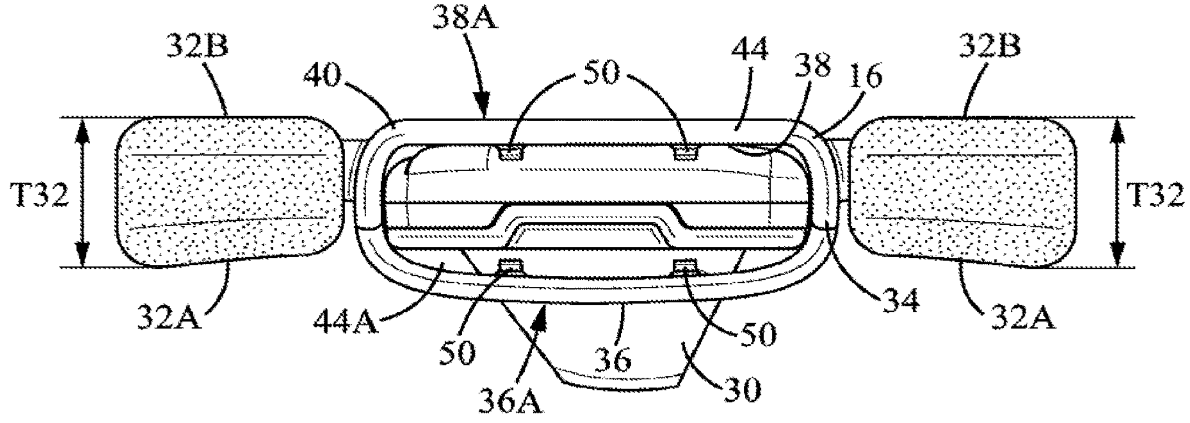
Figure 4F:
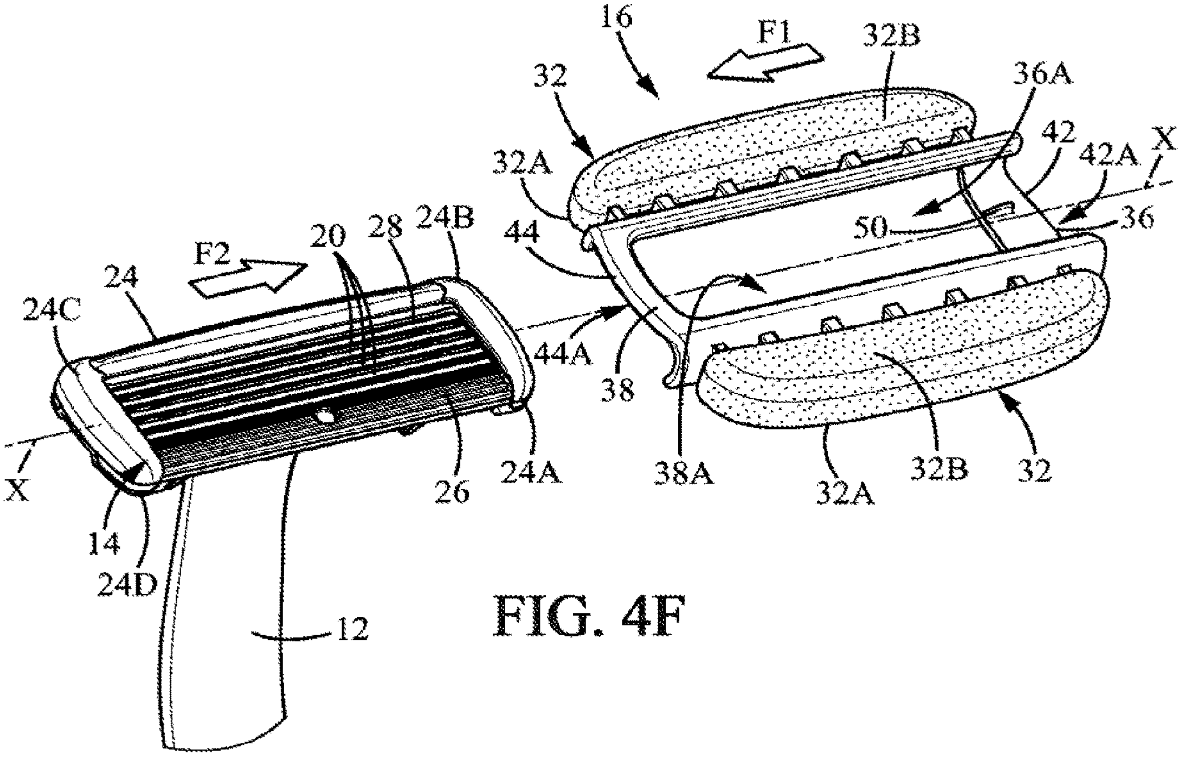
Figure 4G:
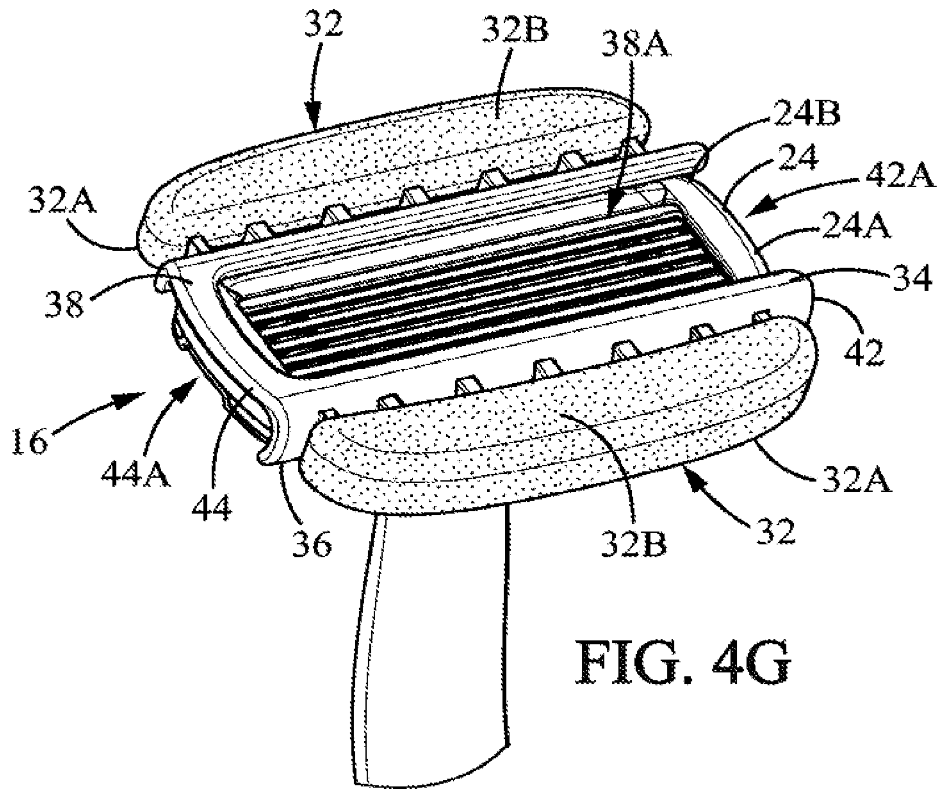
FIG. 4G is a perspective view of a razor of FIG. 4A, the adaptor having being reversed on the shaving cartridge with regard to the attachment illustrated on FIG. 4A.
Figure 4H:
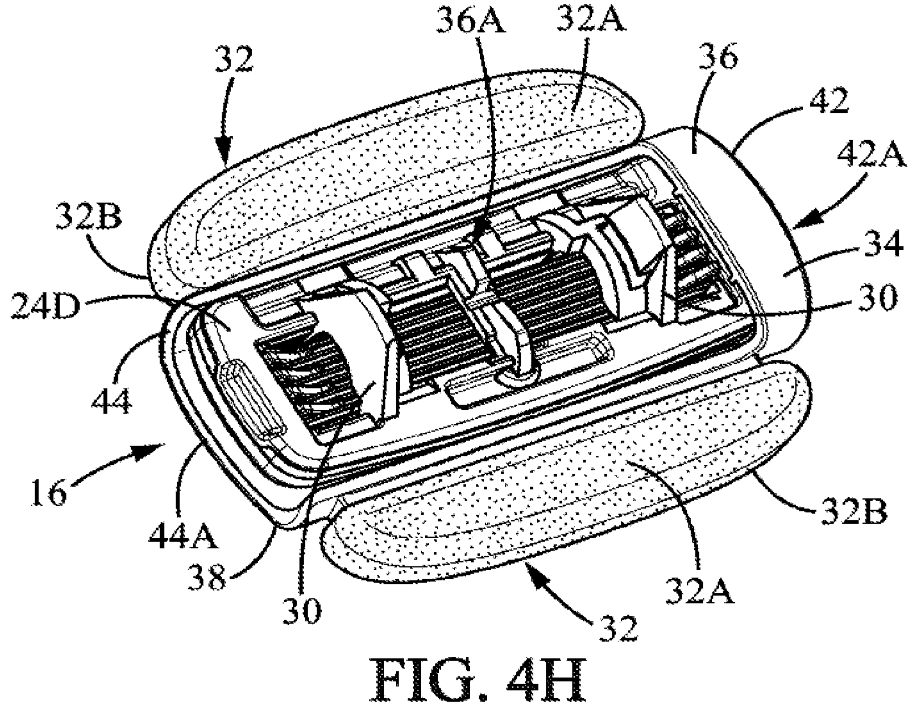
FIG. 4H is a perspective view of a razor of FIG. 4G viewed from the lower side of the shaving cartridge.
Figure 5B:
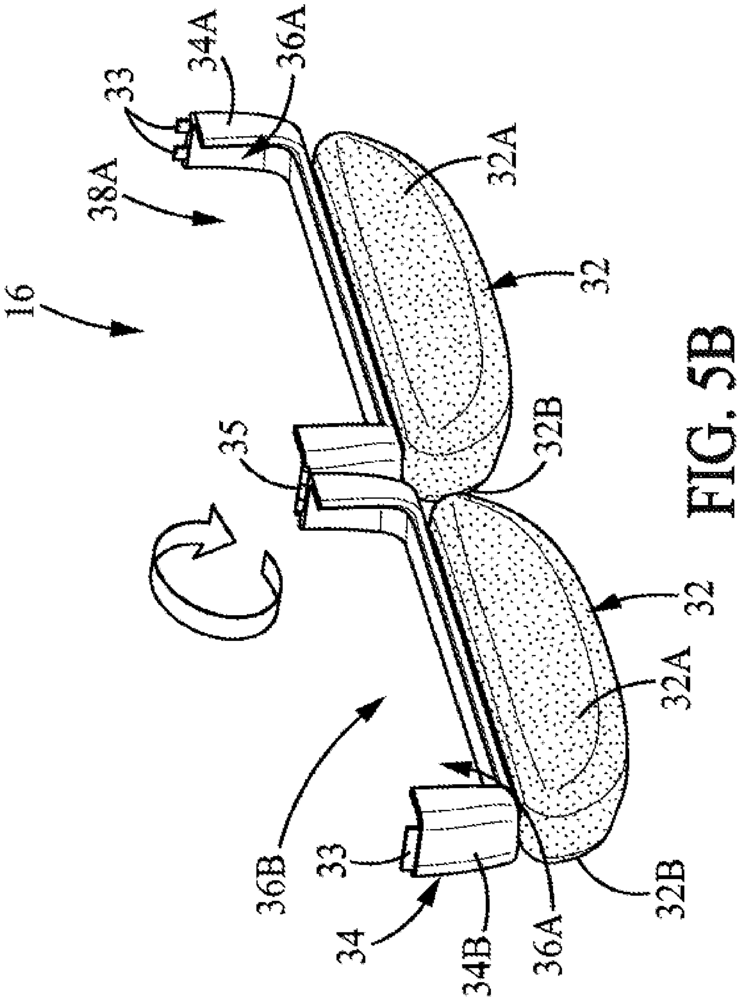
FIG. 5B is perspective view of the adaptor of FIG. 5A without the shaving cartridge and opened.
Figure 5A:
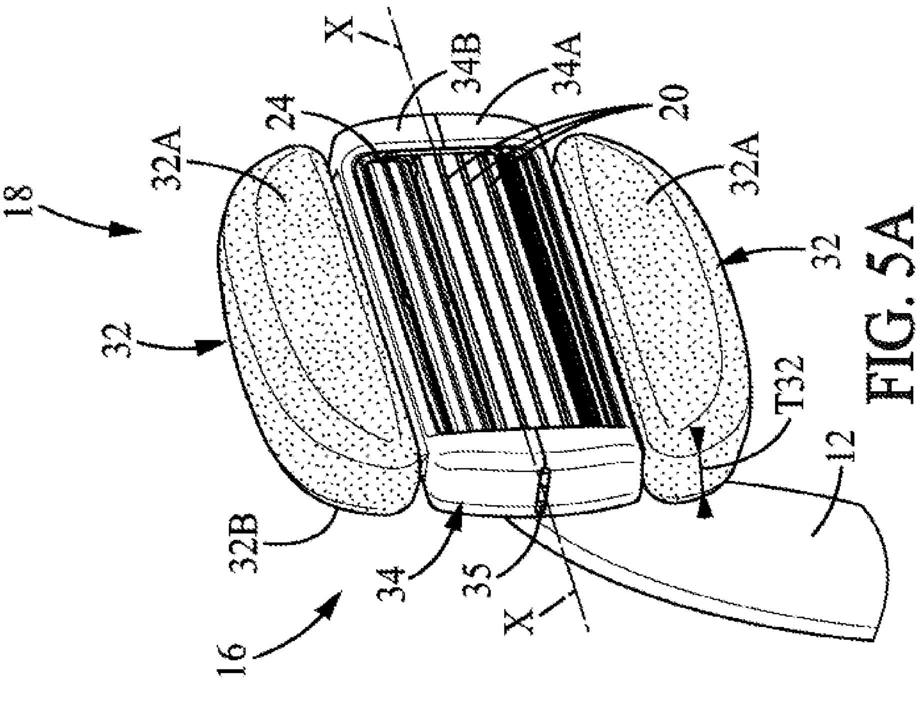
FIG. 5A is a perspective view of an adaptor according to another embodiment connected to a shaving cartridge itself connected to a handle body.
Figure 9C:
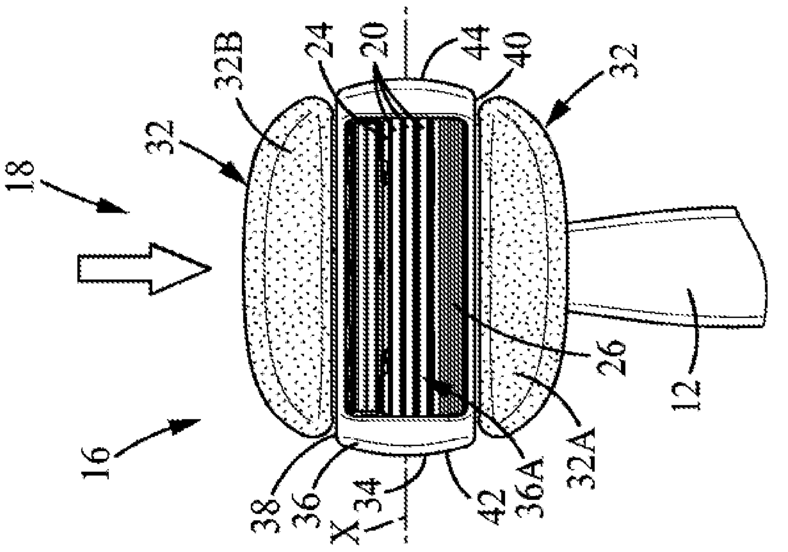
FIGS. 9A-9C are upper views of a shaving assembly with an adaptor according to another embodiment, illustrating the method of reversing the shaving aid, from the shaving cartridge.
Figure 9B:
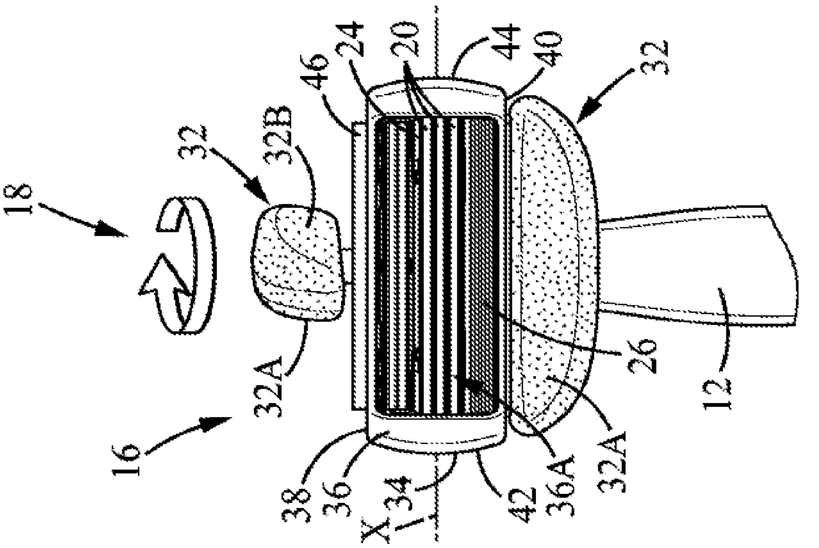
Figure 9A:
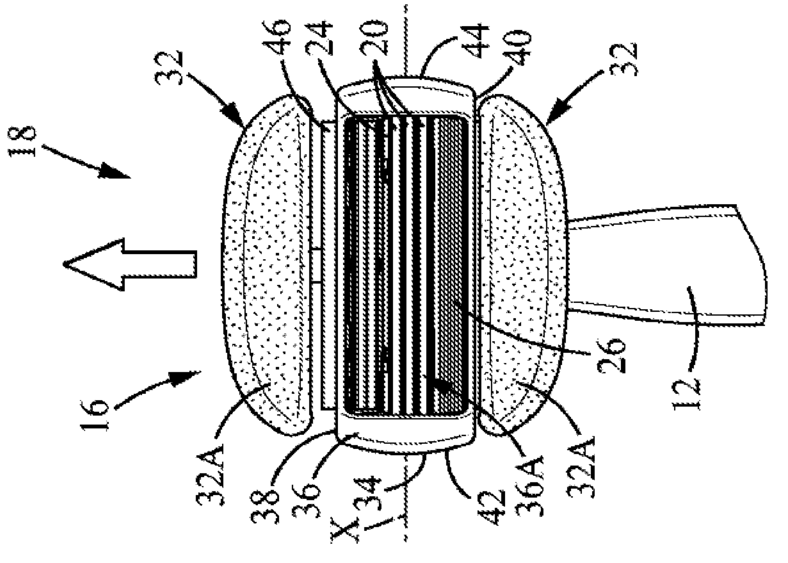

More precisely, FIGS. 1A-1K and 2A-2F illustrate an adaptor connected to the shaving cartridge 14 by snap-fit on one shaving cartridge 14, FIGS. 3A-3B and 4A-4H illustrates an adaptor slidably mounted on one shaving cartridge 14, FIGS. 5A-5B illustrates an adaptor mounted by encasing on one shaving cartridge 14 and FIGS. 9A-9C illustrates an adaptor having shaving aids reversibly mounted on the frame the adaptor.

The adaptors disclosed in the Figures can either be reversible or not as further disclosed hereafter.

As depicted on the Figures, the shaving cartridge 14 has one or more shaving blades 20, each of the shaving blades 20 being provided with a cutting edge 22. More precisely, the shaving cartridge 14 comprises a housing 24 which has a front edge 24A and a rear edge 24B, an upper face 24C and an opposed lower face 24D and into which the one or more shaving blades 20 are located (between the front edge and the rear edge). The shaving blades 20 might be movably mounted on elastic fingers provided on the housing or might be fixed. The number of shaving blades 20 might be comprised between one and five for instance, and is preferably of three or four.

The housing 24 is preferably elongated, extending along a longitudinal axis X-X. A guard bar 26 and respectively a lubra 28 might be also provided on the upper face 24C of the housing 24, respectively in front the shaving blades 20 and aft them.

The cutting edge 22 of each shaving blades 20 extends preferably longitudinally along the longitudinal axis X-X.

The shaving assembly is provided with connecting means for connecting the shaving assembly 18 to the razor handle 12. More precisely, either the shaving cartridge 14 or the adaptor 16 can be provided with connecting means for connecting the shaving assembly 18 to the razor handle 12. According to the connecting means, the connection between the razor handle 12 and the shaving assembly 18 is fixed or pivotable.

In the examples depicted on the figures, the connecting means 30 (as best seen on FIGS. 4H, 6 and 7) allow a pivot of the shaving assembly 18 with regard to the razor handle 12 (around the elongated axis X-X), but the present invention is not limited to a pivotable shaving assembly. As illustrated, the connecting means 30 are preferably provided on the shaving cartridge 14 (on the lower face 24D of the housing 24), especially when the adaptor 16 is reversible as described in details below.

The reversibility disclosed in the present invention concerns two kinds:

a reversibility about the longitudinal axis X-X.

a reversibility sensibly perpendicular to the longitudinal axis X-X.

The connecting means 30 can comprise shell bearings, especially when the shaving assembly 18 is pivotable with regard to the razor handle 12, but the present invention is not limited to this kind of connecting means. Besides, the handle 12 can be detachable from the shaving cartridge 14 or non-detachable according to the razor; more precisely, the handle 12 is detachable when the razor is a system (meaning the shaving cartridge 14 is changed by a new one when the blades are dulled, while the handle is kept), whereas the handle is non-detachable when the razor is a disposable one (meaning both the shaving cartridge 14 and the handle are changed by new ones when the blades are dulled).

The adaptor 16 of the present invention is provided with at least one shaving aid and is preferably provided with two shaving aids or four shaving aids (not illustrated). In the examples depicted on the figures, the adaptor 16 is provided with one or two shaving aids 32 one of them being located in front of the forward-most blade and the other one being located aft of the aft-most blade, when the adaptor 16 is mounted on the shaving cartridge 14). The shaving aids 32 extend longitudinally along the longitudinal axis X-X. Besides, at least one or two other shaving aid(s) can further be provided on the adaptor (not depicted), more precisely on its lateral faces, obliquely with regards to the cutting edges.

As best seen on FIGS. 1A, 2A, 3A, 4A and 5A the adaptor 16 comprises preferably a frame 34 having a first wall 36 (upper surface), a second wall 38 (lower surface) opposed to the first wall 36, a side wall 40 extending from the first wall 36 to the second wall 38, a first end 42 and a second end 44 opposed to the first end 42.

The first wall 36 has a first opening 36A and the second wall 38 of the frame has a second opening 38A as best visible on FIGS. 10, 20, 3B, 4B-4F, 5B, 6 and 7. In reference to FIGS. 1A, 2A, 3A, 4A and 5A when the frame 34 is mounted on the shaving cartridge 14, the cutting edge 22 of the shaving blades 20 is at least partly, preferably totally (FIGS. 2A, 4A and 5A), uncovered by the adaptor and is accessible through the first opening 36A in order to allow the shaving, whereas the second opening 38A allows the connecting means 30 to be accessible and to be connected to a razor handle.

When the adaptor is reversible around axis X-X, the second opening 38A is also designed, as detailed after, such that the cutting edge of the one or more shaving blades is at least partially uncovered and is accessible through the second opening 38A when the adaptor is reversed on the shaving cartridge 14 (by rotation about axis X-X).

In reference to FIGS. 1A-1C and 1H-1K, to FIGS. 2A-2F, 4A-4G and to FIGS. 5A-5B, when the adaptor 16 is reversibly mountable on the shaving cartridge 14, the frame 34 might be reversely mountable on the shaving cartridge 14; in that last case, the cutting edge 22 of the shaving blades 20 is at least partly, preferably totally, uncovered by the adaptor 16 and is accessible through the second opening 38A in order to allow the shaving, whereas the first opening 36A allows the connecting means 30 to be accessible and to be connected to a razor handle. Thus, in that case, the frame 34 of the adaptor 16 can be mounted on the shaving cartridge 14 such that the cutting edges 22 are accessible through either the first opening 36A or the second opening 38A. For the embodiments depicted on FIGS. 1A-1C and 1H-1K and on FIGS. 2A-2F (snap-fitting), according to the shape and dimension of the first opening 36A and of the second opening 38A, the connection to the shaving cartridge 14 might be obtained from the first opening 36A and/or from the second opening 38A (FIGS. 1H and 2E).

The adaptor 16 can further comprise at least one shaving aid holder configured to hold the at least one shaving aid. More precisely, as best seen on FIG. 8, which illustrates only the adaptor (without the shaving cartridge and the handle), the adaptor 16 comprises two shaving aid holders 46, each provided with one shaving aid 32.

When the adaptor has only one shaving aid 32 and it is attached to a shaving cartridge (see FIG. 1A), only one shaving aid holder 46 is provided and it extends outwardly with regard to the shaving cartridge 14 when the adaptor 16 is mounted on the shaving cartridge 14. The shaving aid holders 46 can be located in front of the forward-most blade (and in front of the guard bar 26 when it exists) or as depicted on FIG. 1A it can be located aft of the aft-most blade (and aft of the lubra 28 when it exists).

When attached to one shaving cartridge (see FIGS. 2A, 3A, 4A and 5A), one of the shaving aid holders 46 extends outwardly with regard to the shaving cartridge 14 when the adaptor 16 is mounted on the shaving cartridge 14, and is located in front of the forward-most blade (and in front of the guard bar 26 when it exists) and the other one is located aft of the aft-most blade (and aft of the lubra 28 when it exists).

Each of the shaving aids 32 has a shaving aid body 32 which is preferably solid and which can comprise a lubricant, a moisturizer, a conditioner and/or an exfoliant.

The shaving aids 32 can be designed such that they are provided with two opposed faces. More precisely, each shaving aid 32 has a first face 32A and an opposed second face 32B. The shape of the shaving aids can be of several kinds; for instance, the shapes of the first and second faces 32A, 32B might be a square surface, a rectangular surface, or an oval surface, etc., as long as they provide one face 32A or 32B which enters in contact with the skin during shaving. The thickness T32 of each shaving aid 32 is adapted to the height of the adaptor and to the height of the shaving cartridge 14 such that when the adaptor is mounted on the shaving cartridge 14, the corresponding face 32A (or 32B) enters in contact with the skin of the user during shaving (and at least one of the cutting edges is also in contact with the skin of the user during shaving).

The shaving aid holder is configured to hold the shaving aids 32 such that during shaving only one of the faces 32A, 32B is used for each shaving aid 32. This means, that as depicted on FIG. 1A, when the first face 32A of the shaving aid 32 is able to be used during shaving, the opposed faces 32B is not accessible to be used for shaving. This means, that as depicted on FIGS. 2A, BA, 4A and 5A, when the adaptor is provided with two shaving aids the two first faces 32A of the shaving aids 32 are able to be used during shaving, whereas the two opposed faces 32B are not accessible to be used for shaving.

When the adaptor 16 is reversible about axis X-X, both faces of each shaving aids 32 can be successively used. Actually, the first face 32A of each shaving aid 32 is useful when the cutting edges 22 are accessible through the first opening 36A, whereas the second face 32B of each shaving aids 32 is useful when the cutting edges 22 are accessible through the second opening 38A (after having reversed the adaptor on the shaving cartridge). Thus, when the first face 32A of the shaving aids 32 is outworn, the adaptor 16 can be reversed by the user such that the second face 32B of each shaving aids 32 can be used during further shaving (as depicted on FIGS. 1G, 2F and 4G).

As already mentioned, the adaptor of the present invention can be mounted on the shaving cartridge, slidably, by snap-fit and/or by encasing. Besides, the adaptor of the present invention can be reversible or not. To be changed (either by reversing or by a new adaptor), the adaptor is preferably detachable from the shaving cartridge. Besides, the adaptor of the present invention can be reversible around the longitudinal axis X-X and/or transversally to it.

The adaptor 16 receives preferably frictionally the shaving cartridge 14 such that it can be mounted and naturally maintained on the shaving cartridge 14; this means that the frame 34 of the adaptor 16 is designed to cooperate with friction with the housing 24 of the shaving cartridge 14.

The adaptor can also be elastically mountable on the shaving cartridge; more precisely, the frame 34 of the adaptor might deform elastically during its connection to the shaving cartridge 14. This means that the elasticity of the frame 34 is higher than that of the shaving housing 24.

According to the friction forces and to the elasticity of the adaptor, after mounting, the adaptor 16 can be definitely connected to the shaving cartridge 14 or preferably releasably (i.e. detachably) connected to the shaving cartridge 14. When the adaptor 16 is releasably connected to the shaving cartridge 14, the friction between the adaptor 16 and the shaving cartridge 14 might be such that the adaptor 16 is maintained on the shaving cartridge 14 such that it allows the shaving without any risk of detachment. Besides, the voluntary release/detachment of the adaptor 16 from the shaving cartridge 14 can be realized without using of a significant force (a child may obtain the separation of the adaptor from the shaving cartridge) and without help of any tool.

When the adaptor 16 is releasably connected (detachable) to the shaving cartridge 14, the user can shave with or without the adaptor. Besides, when the shaving aids 32 are outworn, the user can change the adaptor by a new one, while keeping the same shaving cartridge 14 and the same razor handle 12.

In summary, in relation with the different kinds of connections between the adaptor and the cartridge as described just above (snap-fitting, sliding, encasing), the adaptor 16 of the present invention can be reversibly mounted on the shaving cartridge 14.

The reversibility of the adaptor 16 can be obtained either with a reversible frame 34 as described above (in reference to FIGS. 1A-11C and 1F-1K, to FIGS. 2A-2F, 4A-4H and to FIGS. 5A-5B) and/or with reversible shaving aids 32 as described hereafter and in reference to FIGS. 9A-9C and 10. When the shaving aids 32 are outworn, the user can thus either reverse the frame 34 of the adaptor 16 on the shaving cartridge 14 or reverse the shaving aid on the shaving cartridge, more precisely on the frame onto which they are reversibly attached. Besides, the shaving aid can be releasable with regard to the frame such that it can be changed by another one when outworn or kept in being reversed on the frame to allow its second face to be used.

When the shaving aids 32 are unreleasably (inseparably or non-detachable) maintained on the shaving aid holders 46, they are preferably molded on the last. As best seen on FIG. 8, the shaving aid holders 46 are in that case preferably provided with holes 48 through which the shaving aids 32 can spread through during manufacturing. After manufacturing, the shaving aids 32 are non detachable from the shaving aid holders 46, like anchored on the shaving aid holders 46.

Figure 6:
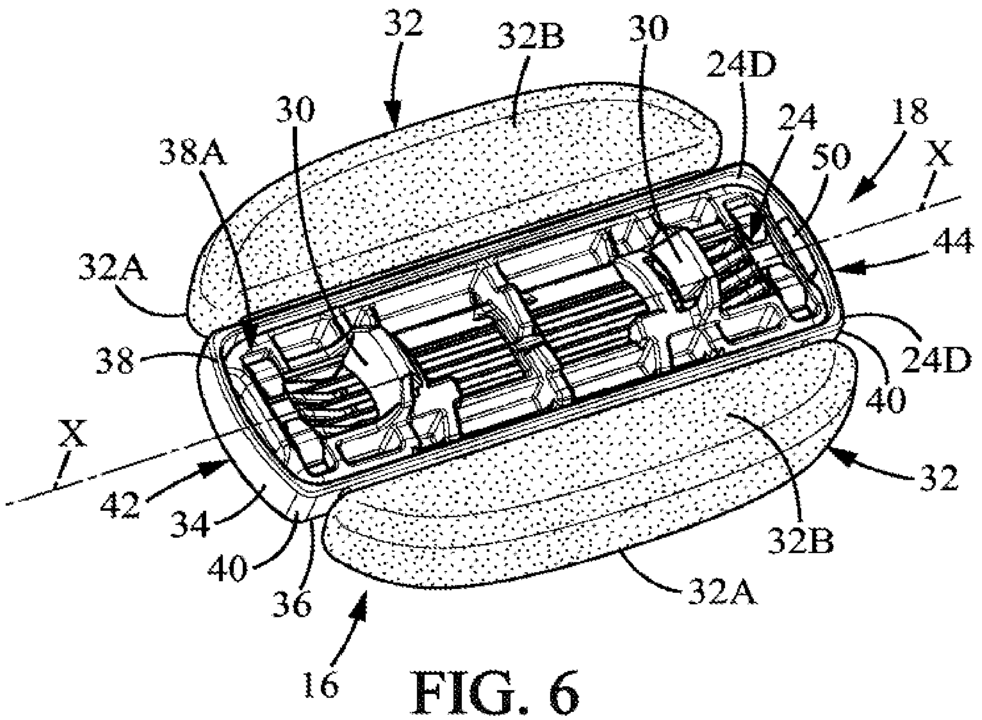
FIG. 6 is a perspective view of the shaving assembly of FIG. 1A or 2A viewed from the lower side of the shaving cartridge.
Figure 7:
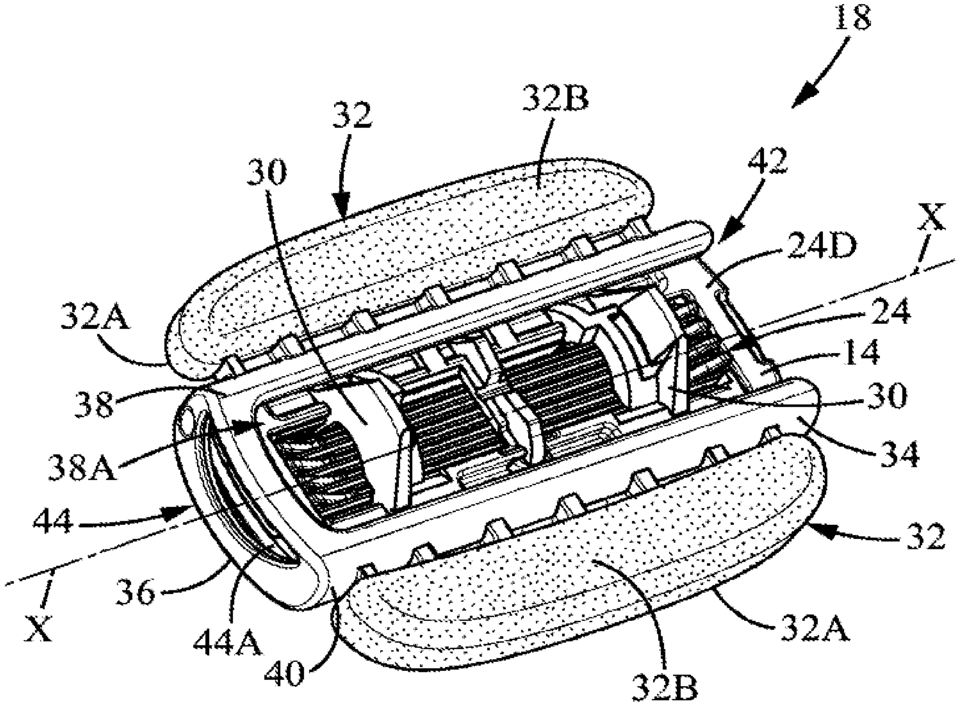
FIG. 7 is a perspective view of the shaving assembly of FIG. 4A viewed from the lower side of the shaving cartridge.

The shaving aid holders 46 can be unitary with the frame 34 of the adaptor 16 and extend from the side wall 40 such that the shaving aid holders 46 are unreleasably (inseparably) connected on the frame 34 as depicted on FIG. 6.

When the shaving aid 32 is outworn, the user needs to change the whole adaptor 14 by a new one unless it is reversible.

In reference to FIGS. 9A-9C, the shaving aids 32 are attached to the shaving aid holders 46, preferably unreleasably, whereas each of the shaving aid holders 46 is reversibly mounted on the frame 34, for instance in being rotatably mounted on the frame 34. As depicted on the FIGS. 9A-9C, the shaving aid holders 46 are able to be twisted on the frame 34 such that when outworn the first face 32A can be replaced by the opposed second face 32B for further shaving without detaching the adaptor 16 from the shaving cartridge 14. More precisely, FIG. 9A illustrates the adaptor with both first faces 32A to be used during shaving, FIG. 9B illustrates the way of reversing the face (from first to second) for instance by twisting it and FIG. 9C illustrated the adaptor with one second face 32B to be used during shaving (the other shaving aid 32 one be still used with its first face 32A). The adaptor 16 can thus be used during shaving either with both first faces 32A, with both second faces 32B or with a mix of a first face 32A and a second face 32B. The shaving aid holders 46 might besides also are a little bit slidably mounted on the frame 34 to avoid any friction of the shaving aids 32 when reversed on the frame 34.

Figure 10:
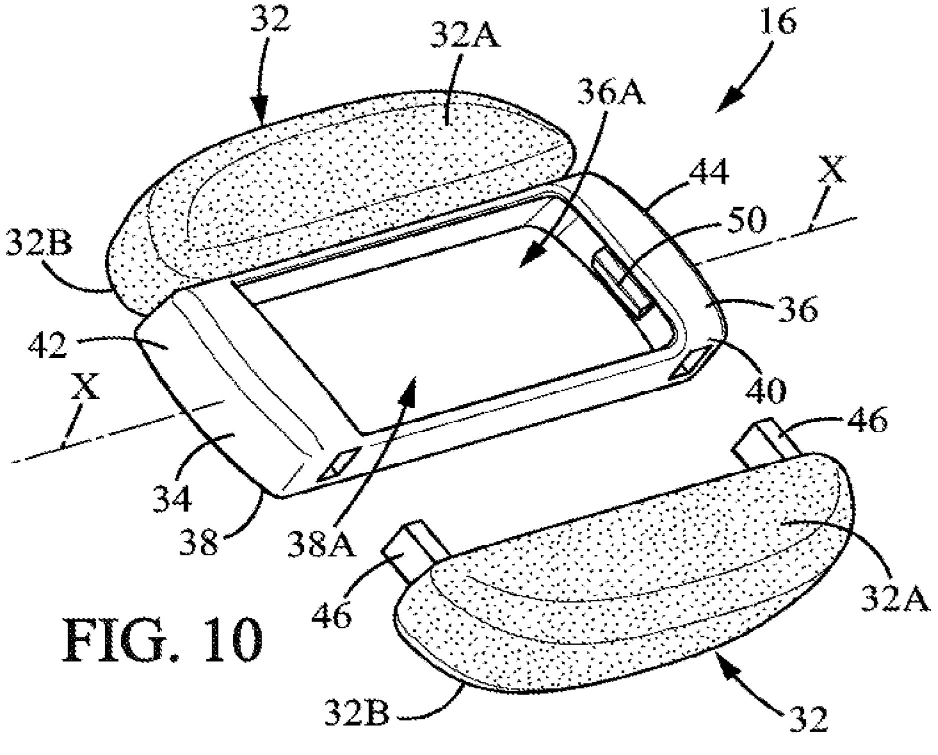
FIG. 10 is an exploded perspective view of the adaptor of the present invention having detachable shaving aids.

In reference to FIG. 10, the shaving aids 32 are attached to the shaving aid holders 46, whereas each of the shaving aid holders 46 is releasably mounted on the frame 34. The shaving aid holders 46 are able to be attached on and detached from the frame 34 such that when outworn the first face 32A can be replaced by the opposed second face 32B for further shaving without detaching the adaptor 16 from the shaving cartridge 14. The frame 34 may allow an attachment to the shaving cartridge by sliding, snap-fitting (as illustrated on FIG. 10) or by encasing.

Figure 1B:
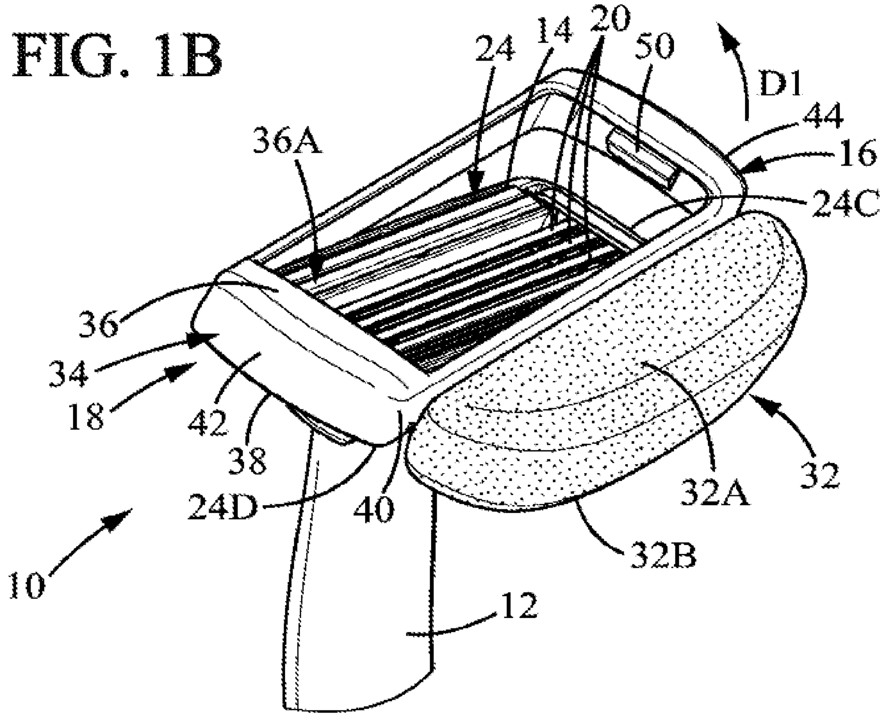
FIG. 1B is a perspective view of the razor of FIG. 1A, illustrating the method of detaching the adaptor of FIG. 1A from the shaving cartridge.
Figure 1C:
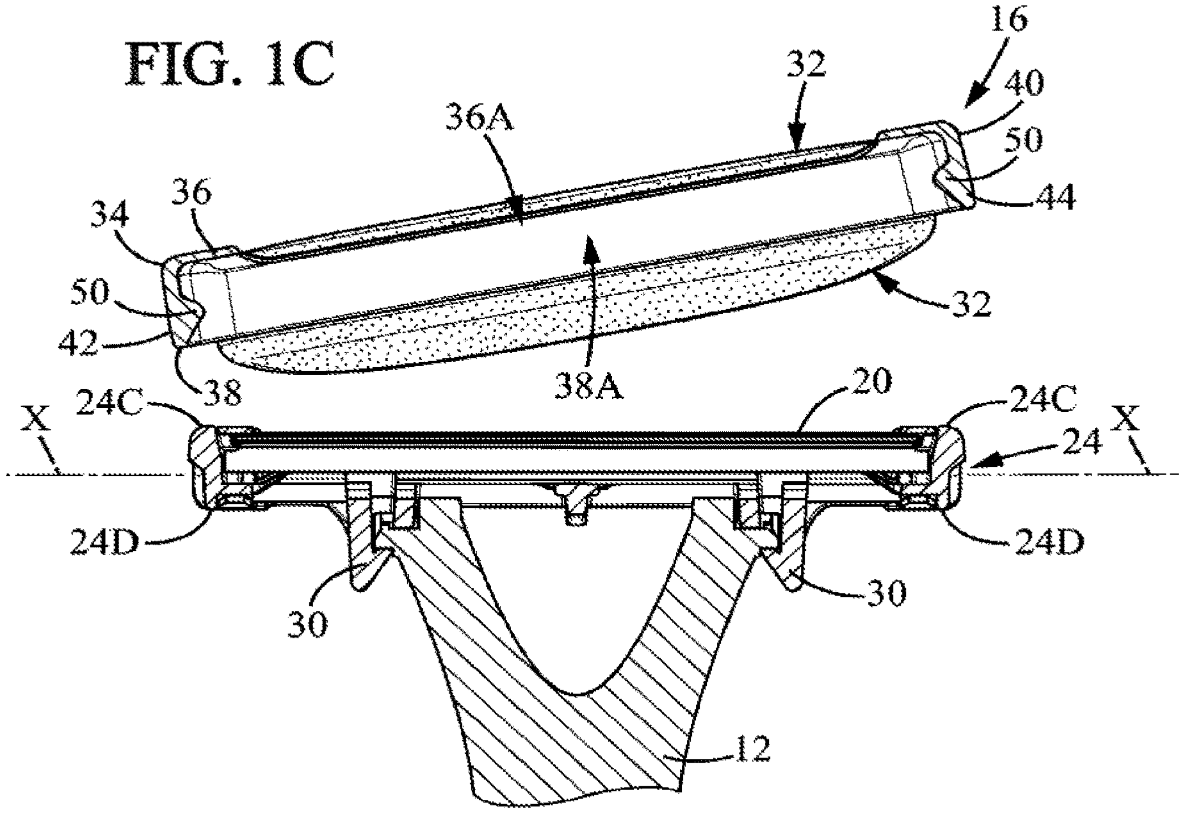
FIG. 1C is a sectional view of the razor of FIG. 1A, illustrating the method of detaching the adaptor of FIG. 1A from the shaving cartridge.
Figure 1D:
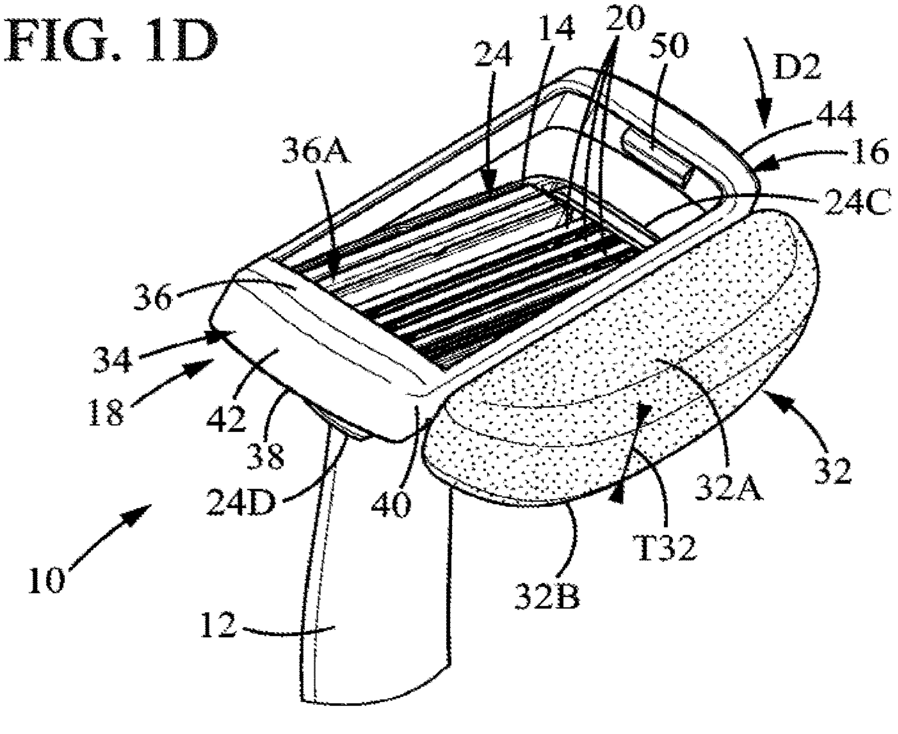
FIGS. 1D-1E are perspective views of the razor of FIG. 1A, illustrating a method of attaching the adaptor of FIG. 1A on the shaving cartridge.
Figure 1E:
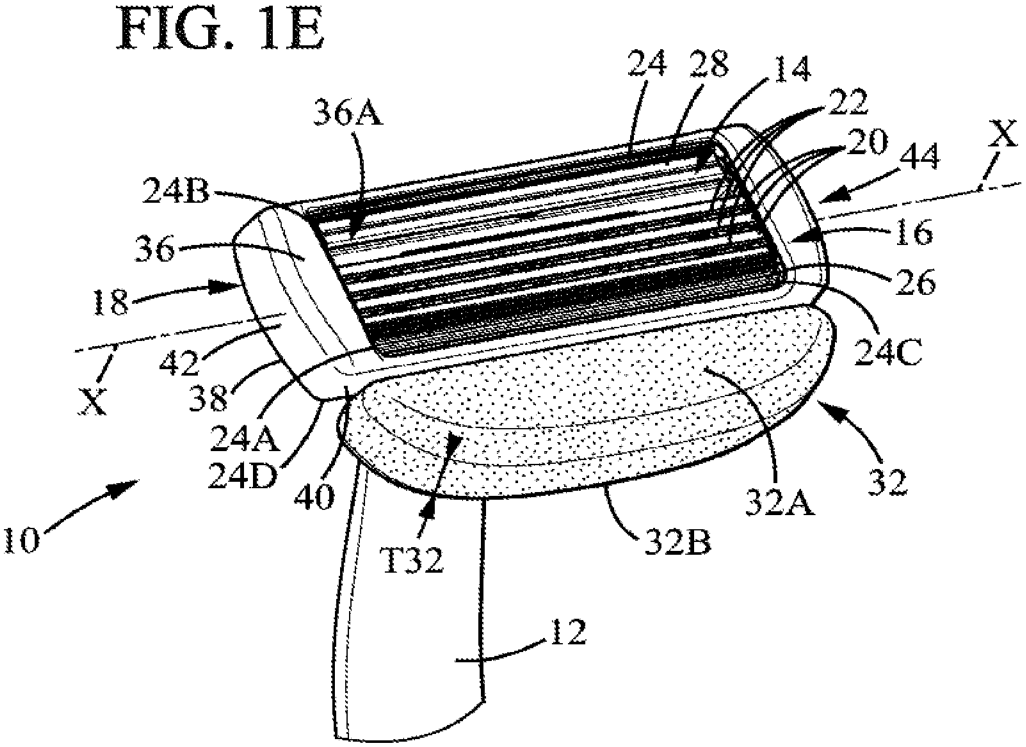
Figure 1F:
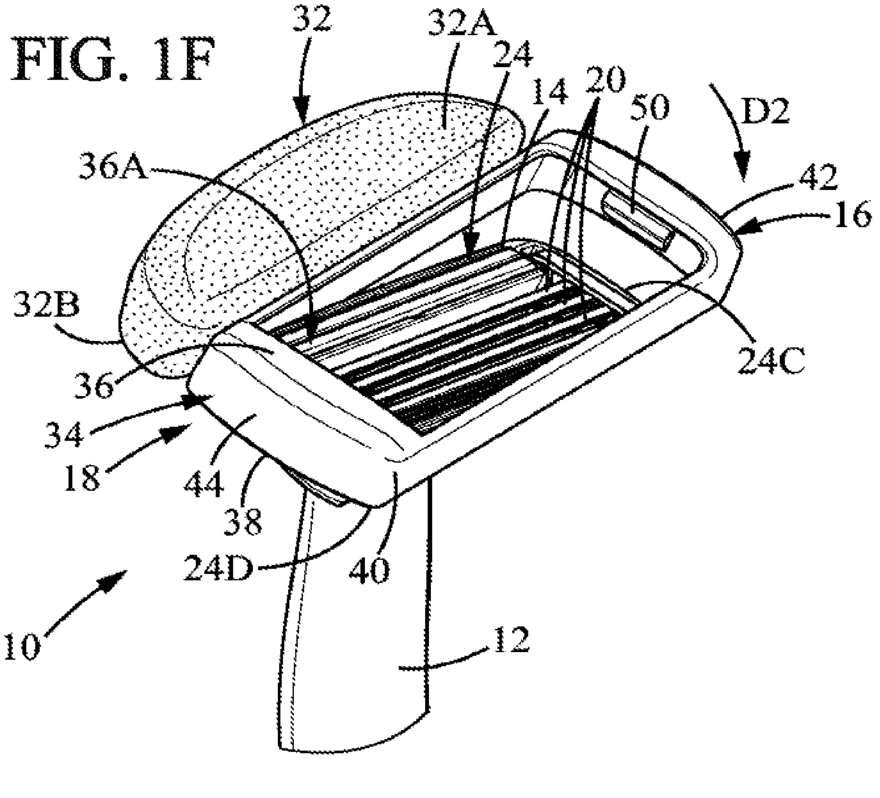
FIGS. 1F-1G are perspective views of the razor of FIG. 1A, illustrating another method of attaching the adaptor of FIG. 1A on the shaving cartridge.
Figure 1G:
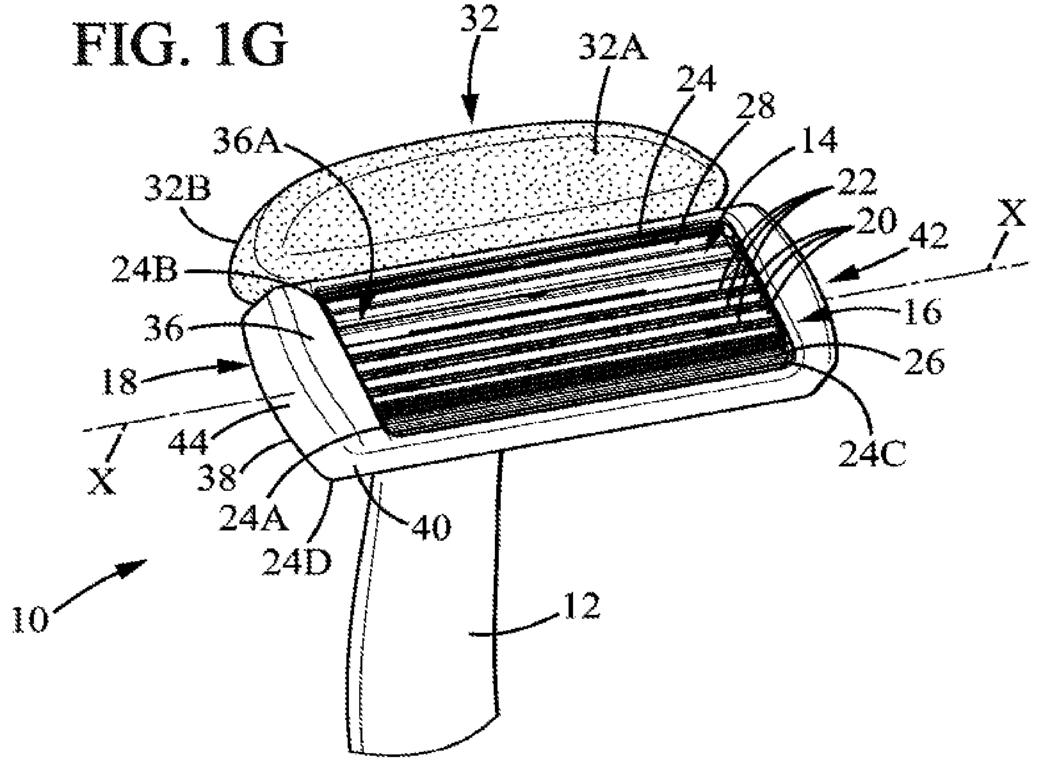
Figure 1H:
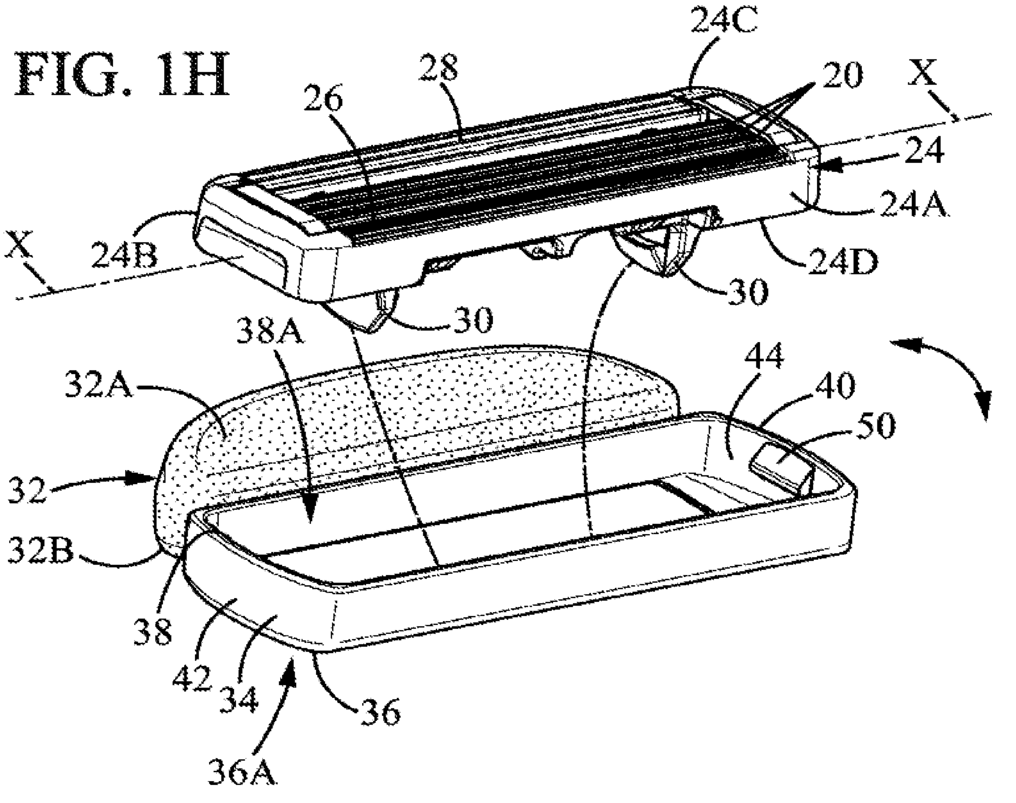
FIGS. 1H-1J are perspective views of the razor of FIG. 1A, illustrating another method of attaching the adaptor of FIG. 1A on the shaving cartridge.
Figure 1I:
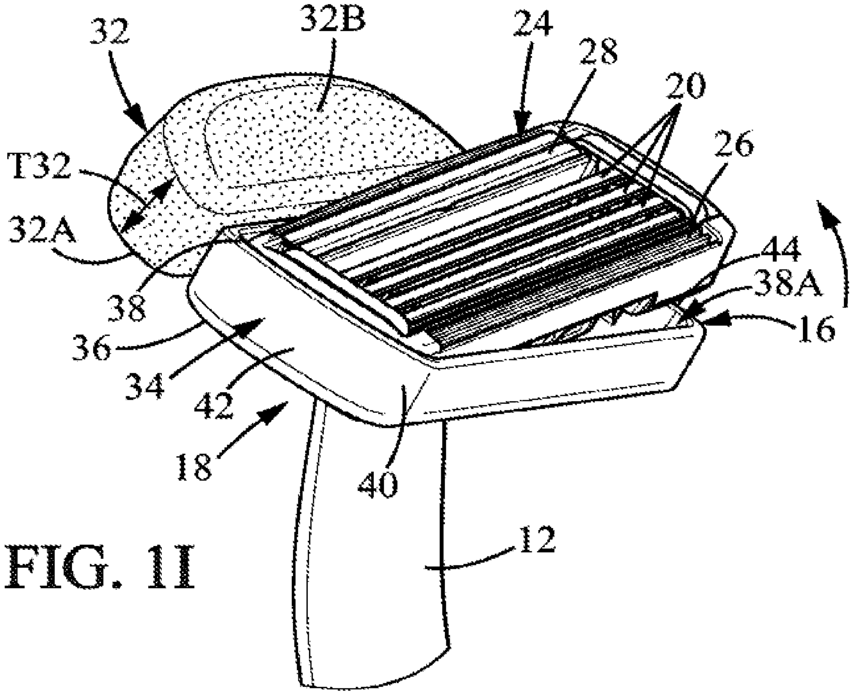
Figure 1J:
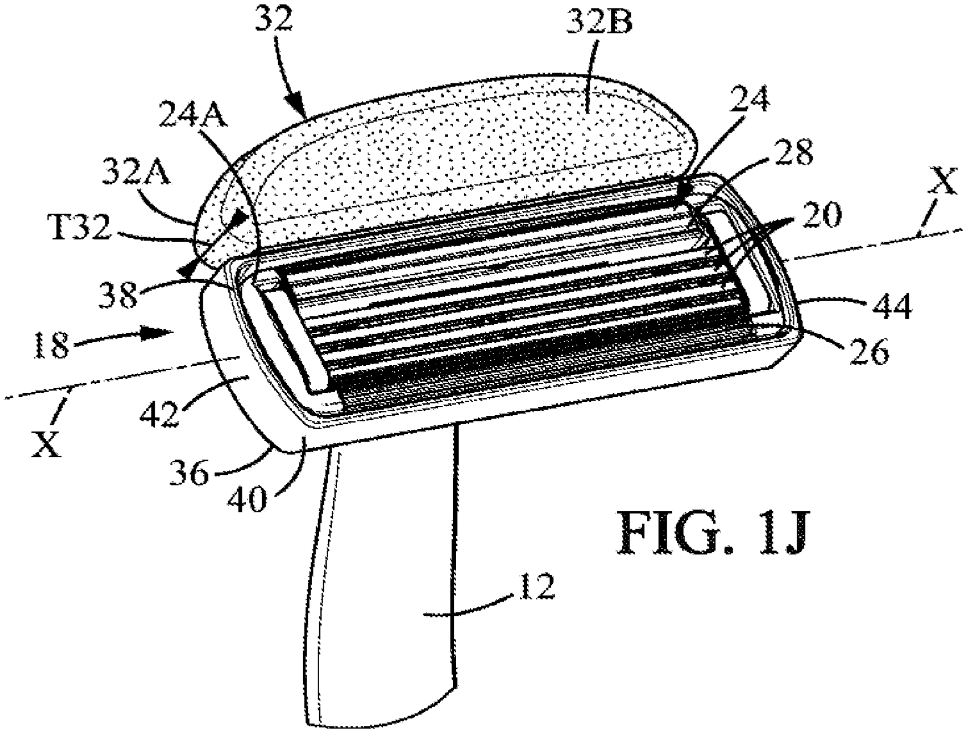
Figure 1K:
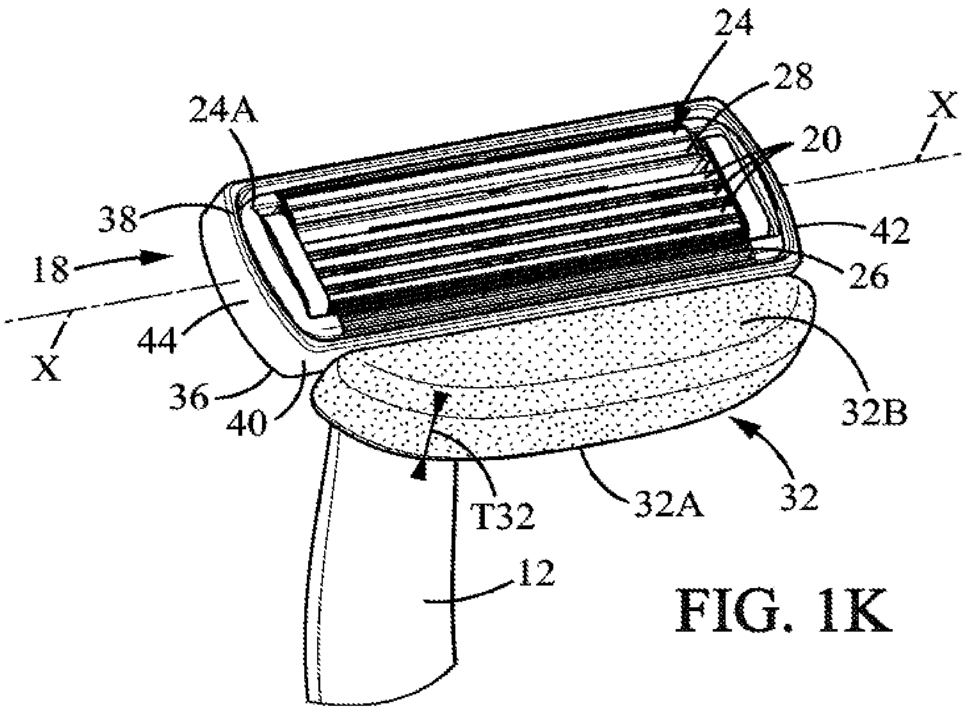
FIG. 1K is a perspective view of a razor of FIG. 1A, the adaptor having being reversed on the shaving cartridge according to another method of attaching the adaptor of FIG. 1A on the shaving cartridge.

We will now describe the method of using an adaptor attached on the shaving cartridge by snap-fitting (see FIGS. 1A-1K). FIGS. 1A to 1C depict an adaptor which can be both reversible and not. FIGS. 1D and 1E depict a replacement of the adaptor by a new one. FIGS. 1F and 1G depict an adaptor reversed at least perpendicularly to the axis X-X, FIGS. 1H and 1J depict an adaptor reversed at least about the axis X-X, and FIG. 1K depicts an adaptor reversed both perpendicularly and about the axis X-X.

As best seen on FIGS. 1B to 1D, 1F and 1H, one or more bulges 50 can be provided on the frame 34 to allow the attachment and firmly maintain the adaptor 16 onto the shaving cartridge 14 after the snap-fitting occurred. Actually, the adaptor can be reversible for instance according to its geometry (first opening 36A, second opening 36B, bulge 50, etc.) and to the geometry of the shaving cartridge 14.

In reference to FIGS. 1A-1E, when the adaptor 16 is not reversible, only the first faces 32A of the shaving aids are used during shaving. Thus, when the first faces 32A of the shaving aids 32 are outworn, the user changes the adaptor 16 by a new one. As best depicted on FIG. 1B, the user detaches the adaptor 16, more precisely the frame 34, from the shaving cartridge 14 in unsnapping it from the last, for instance in direction D1. When the adaptor is completely separated from the shaving cartridge 14 as depicted on FIG. 1C, the user can attach a new adaptor 16 by snap-fitting as depicted on FIG. 1D, for instance in direction D2 (opposed to direction D1) and shave with a razor as depicted on FIG. 1E (provided with a new adaptor). The shaving aid 32 was located for instance forward the cutting edges as depicted on FIG. 1A and after change of the adaptor, the shaving aid 32 can again be located forward the cutting edges as depicted on FIG. 1E.

In reference to FIGS. 1A-1C and further to FIGS. 1F-1G or to FIG. 1K, when the adaptor 16 is reversible perpendicularly to the axis X-X, the user can reverse the frame 34 such that the user changes the location of the shaving aid 32 with regard to the cutting edges 22. Actually, the user detaches the frame 34 from the shaving cartridge 14 in unsnapping it from the last (see FIG. 1B), for instance in direction D1. When the adaptor 16 is completely separated from the shaving cartridge 14 (see FIG. 1C), the user can rotate it in order to change its location on the shaving cartridge 14 (see FIG. 1F) and snap-fit it in order to connect it the shaving cartridge 14 (see FIG. 1G). As depicted on FIG. 1A before detachment, the adaptor 16 had its first end 42 provided on the left of the shaving cartridge 14 when seen from a top view (or from a top perspective view like FIG. 1A) and its second end 44 is located on the right, whereas after the adaptor 16 is reversed perpendicularly to the axis X-X, its first end 42 provided on the right of the shaving cartridge 14 when seen from a top view (or from a top perspective view like FIG. 1G) and its second end 44 is located on the left. Besides, since the reversibility disclosed here concerns the one occurring perpendicularly to the axis X-X, before detachment, the first wall 36 (upper surface of the adaptor 16) face 24C of the shaving cartridge (lower surface of the adaptor 16) face 24D of the shaving cartridge after the adaptor 16 is reversed axis X-X the first wall 36 (upper 16) is still located on the upper is located on the upper 14, the second wall 38 is located on the lower 14 (see FIG. 1A), and perpendicularly to the surface of the adaptor face 24C of the shaving cartridge 14, the second wall 38 (lower surface of the adaptor 16) is still located on the lower face 24D of the shaving cartridge 14 (See FIG. 1G). The razor is again ready for shaving.

In reference to FIGS. 1A-1C and further to FIGS. 1H-1J or to FIG. 1K, when the adaptor 16 is reversible about the axis X-X, the user can reverse the frame 34 for instance when the first face 32A of the shaving aid 32 is outworn, such that the second face 32B of the shaving aid 32 can be used during shaving. Actually, the user detaches the frame 34 from the shaving cartridge 14 in unsnapping it from the last (see FIG. 1B), for instance in direction D1. When the adaptor 16 is completely separated from the shaving cartridge 14 (see FIG. 1C), the user can either change it by a new one (as disclosed above and in reference to FIG. 1D) or the user can reverse it and attach it onto the shaving cartridge 14 for instance as disclosed below.

The first opening 36A of the frame which was covering the cutting edges 22 as depicted on FIG. 1A is after having reversed the frame 34 on the shaving cartridge 14 covering the lower face 24D of the housing 24 (not depicted), whereas the second opening 38A which covered the lower face 24D of the housing 24 (see FIG. 6), covers now the shaving blades 20 after having reversed the frame 34 on the shaving cartridge 14 (see FIG. 1J or 1K). The first opening 36A of the adaptor 16 which was connected to the shaving cartridge 14 on the upper face 24C is after reversing connected to the lower face 24D of the housing, whereas the second opening 36B of the adaptor 16 which was connected to the shaving cartridge 14 on the lower face 24D is after reversing about the axis X-X connected to the upper face 24C of the housing. Then, the user can bring the adaptor 16 close to the shaving cartridge 14, for instance from the lower side of the housing 24D (see FIG. 1H). The user can than snap-fit the adaptor 16 on the shaving cartridge 14 (see FIG. 1I) until complete attachment (see FIG. 1J). After that, the razor is ready again to be used with the shaving aids 32 for further shaving. More precisely, the shaving aid 32 of the razor which is now used for shaving on its second face 32B. The location of the shaving aid 32 with regard to the cutting edges 22 is also changed. The shaving aid 32 which was for instance located rearward the cutting edges 22 (see FIG. 1A) is now located in front of the blade edges 22 (see FIG. 1J). In other words, before detachment, the adaptor 16 had its first end 42 provided on the left of the shaving cartridge 14 when seen from a top view (or from a top perspective view like FIG. 1A) and its second end 44 is located on the right, and after the adapter is reversed about the axis X-X, its first end 42 provided is still the left of the shaving cartridge 14 when seen from a top view (or from a top perspective view like FIG. 1J) and its second end 44 is still located on the right. Besides, since the reversibility disclosed here concerns the one occurring about the axis X-X, before detachment, the first wall 36 (upper surface of the adaptor 16) is located on the upper face 240 of the shaving cartridge 14, the second wall 38 (lower surface of the adaptor 16) is located on the lower face 24D of the shaving cartridge 14 (see FIG. 1A), and after the adaptor 16 is reversed perpendicularly to the axis X-X the first wall 36 (upper surface of the adaptor 16) is now located on the lower face 24D of the shaving cartridge 14, the second wall 38 (lower surface of the adaptor 16) is now located on the upper face 24C of the shaving cartridge 14 (See FIG. 1J or FIG. 1K). The razor is again ready for shaving.

When the user want also to change the location of the shaving aid (with regard to the cutting edges 22), the user has just to further reverse the adaptor perpendicular to the axis X-X. In that case, the adaptor had its first end 42 provided on the left of the shaving cartridge 14 when seen from a top view (or from a top perspective view like FIG. 1A) and its second end 44 is located on the right, whereas after the adaptor 14 is reversed both perpendicularly to and about the axis X-X, its first end 42 provided on the right of the shaving cartridge 14 when seen from a top view (or from a top perspective view like FIG. 1K) and its second end 44 is located on the left. The razor is again ready for shaving.

Apart from this embodiment depicted in FIGS. 1A-1K, the embodiments depicted in the other Figures are provided with two shaving aids 32, but they could be provided with a sole one as above disclosed. Besides, the reversibility disclosed hereafter is the one which is made about the axis X-X. This reversibility might occur in replacement and/or combination of a reversibility occurring perpendicularly to the axis X-X as disclosed above.

We will now describe the method of using an adaptor of the embodiment depicted in FIGS. 2A-2F and which is also attached on the shaving cartridge by snap-fitting.

Figure 2A:
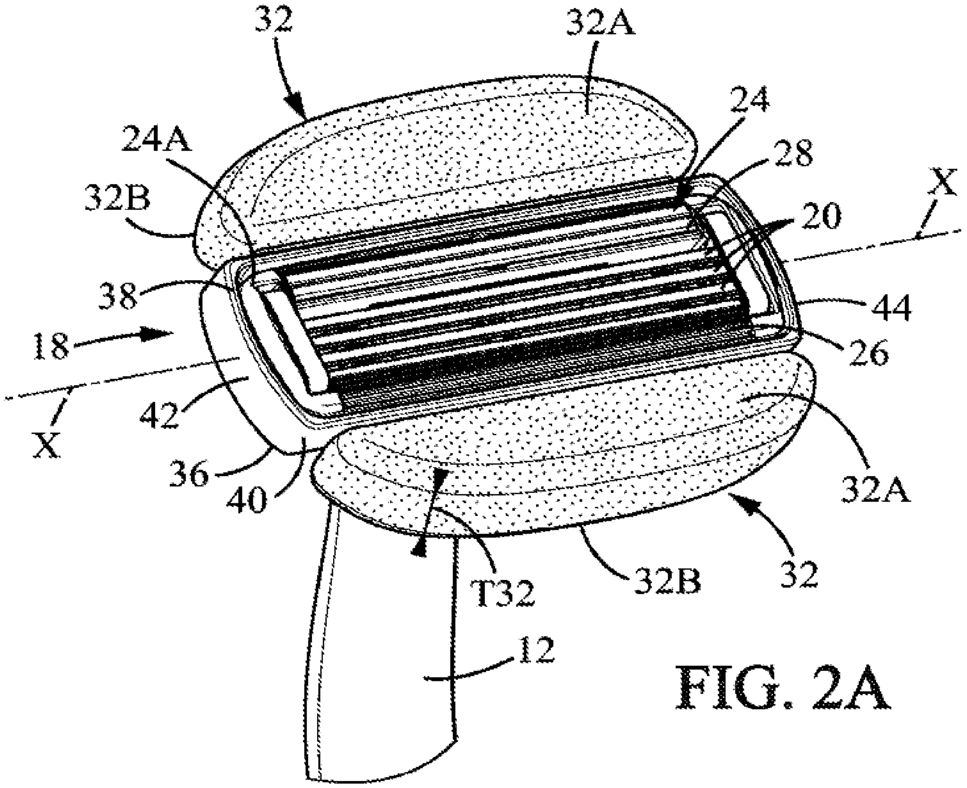
FIG. 2A is a perspective view of an adaptor according to the present invention connected to a shaving cartridge itself connected to a handle body.
Figure 2B:
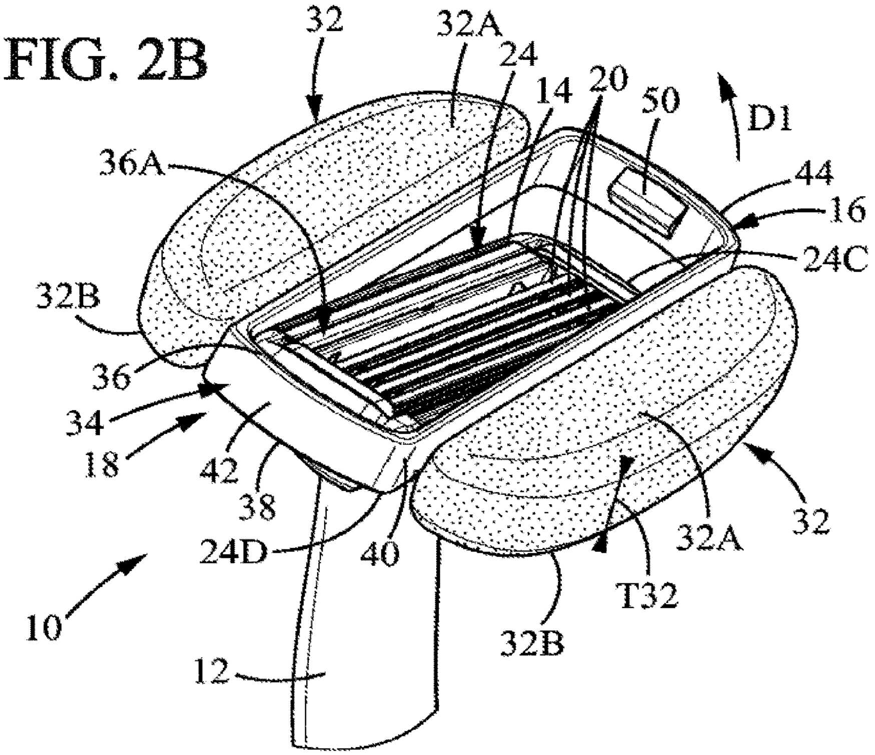
FIGS. 2B and 2D are perspective views of the razor of FIG. 2A, illustrating the method of attaching/detaching the adaptor of FIG. 2A from the shaving cartridge.
Figure 2C:
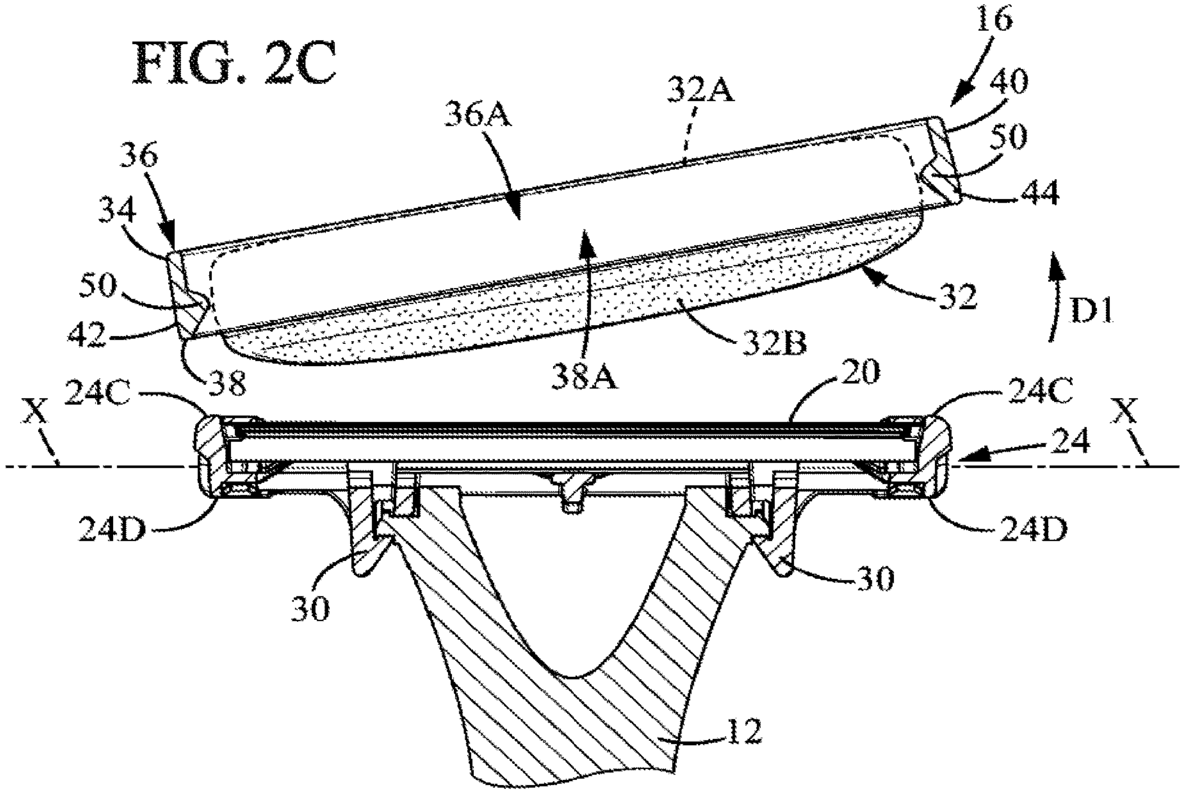
FIGS. 2C and 2E are sectional views of the razor of FIG. 2A, illustrating the method of attaching/detaching the adaptor of FIG. 2A from the shaving cartridge.
Figure 2D:
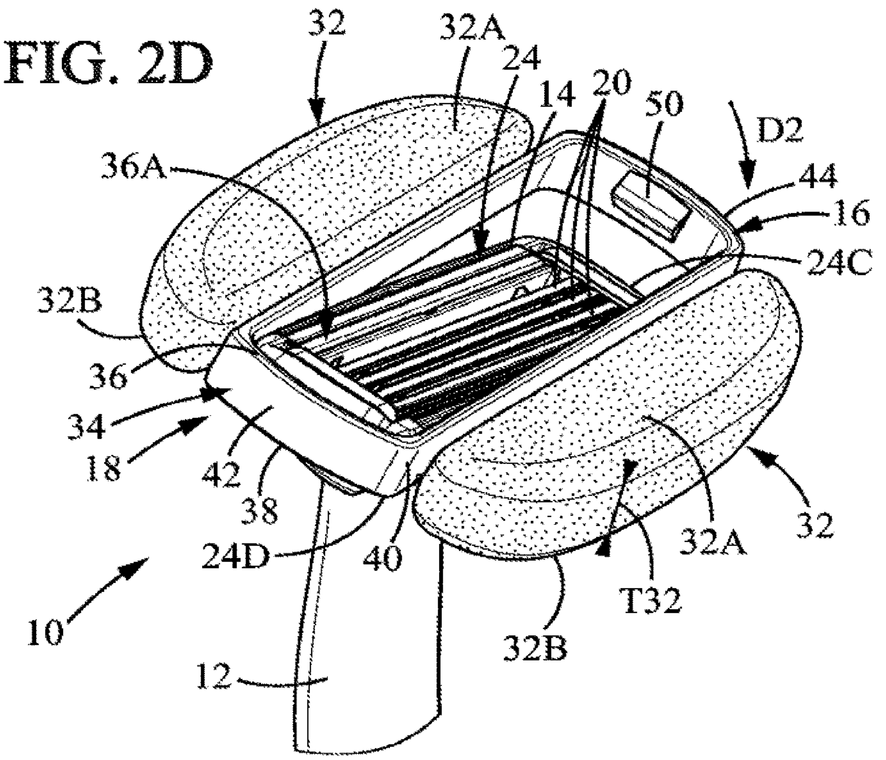
Figure 2E:
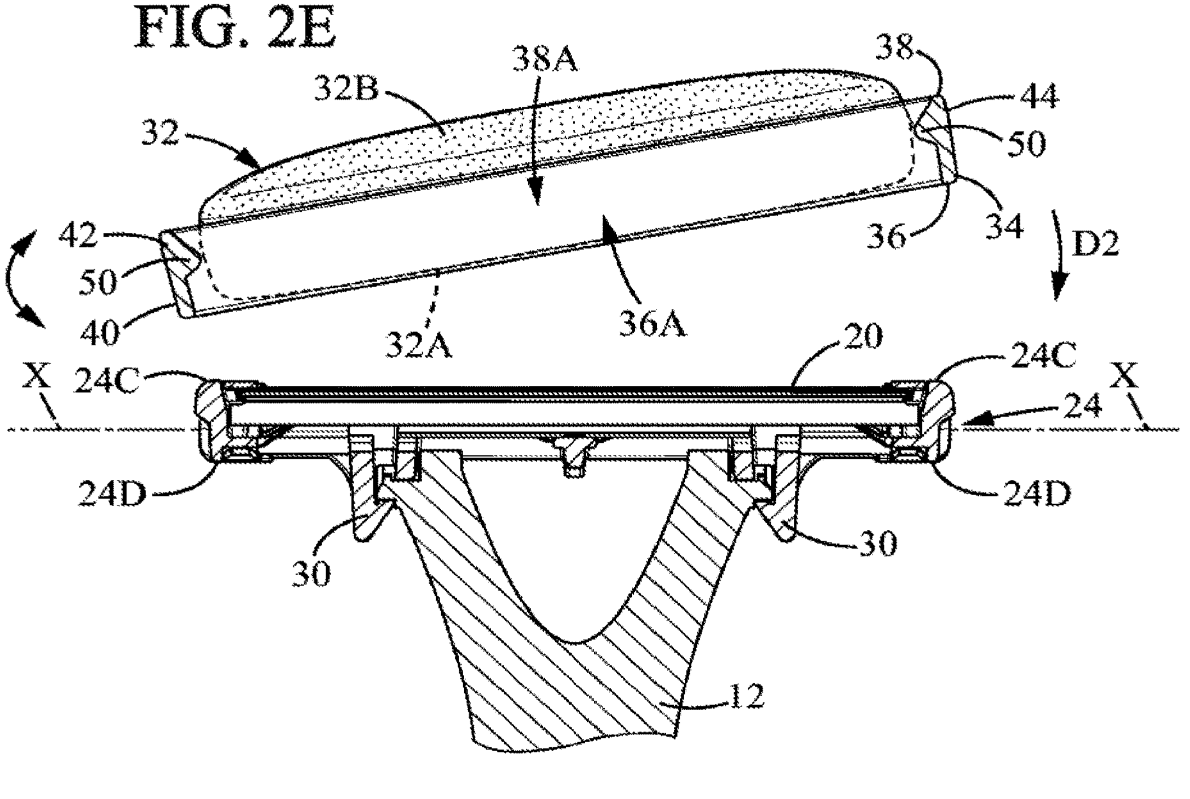
Figure 2F:
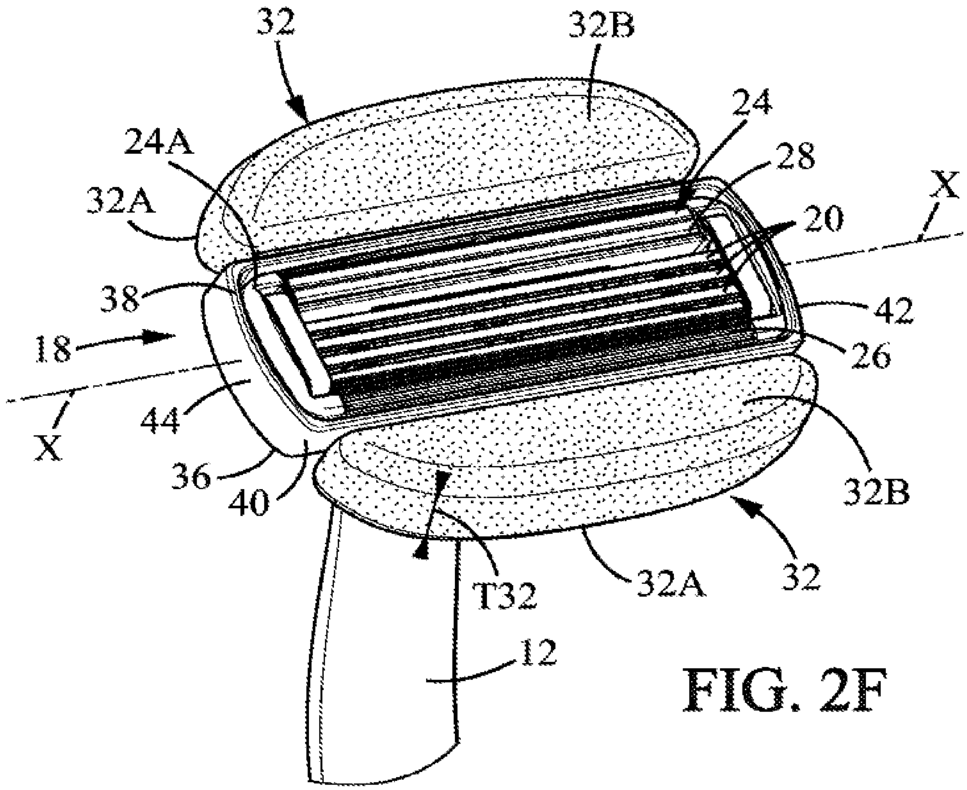
FIG. 2F is a perspective view of a razor of FIG. 2A, the adaptor having being reversed on the shaving cartridge with regard to the attachment illustrated on FIG. 2A.

Like the adaptor disclosed on FIGS. 1A-1K, the adaptor disclosed on FIGS. 2A-2D can be both reversible and not, whereas FIGS. 2E to 2F depict only a reversible adaptor. As best seen on FIGS. 2B to 2E, one or more bulges 50 can be provided on the frame 34 to allow the attachment and firmly maintain the adaptor 16 onto the shaving cartridge 14 after the snap-fitting occurred. Actually, the adaptor can be reversible for instance according to its geometry (first opening 36A, second opening 36B, bulge 50, etc.) and to the geometry of the shaving cartridge 14.

In reference to FIGS. 2A-2D, when the adaptor 16 is not reversible, only the first faces 32A of the shaving aids are used during shaving. Thus, when the first faces 32A of the shaving aids 32 are outworn, the user changes the adaptor 16 by a new one. As best depicted on FIG. 2B, the user detaches the adaptor 16, more precisely the frame 34, from the shaving cartridge 14 in unsnapping it from the last, for instance in direction D1. When the adaptor is completely separated from the shaving cartridge 14 as depicted on FIG. 2C, the user can attach a new adaptor 16 by snap-fitting as depicted on FIG. 2D for instance in direction D2 (opposed to direction D1) and shave with a razor as depicted on FIG. 2A (provided with a new adaptor).

In reference to FIGS. 1A-1D and further to FIGS. 1E-1F, when the adaptor 16 is reversible, the user can reverse the frame 34 when the first faces 32A of the shaving aid 32 are outworn, such that the second faces 32B of the shaving aids 32 can be used during shaving. Actually, the user detaches the frame 34 from the shaving cartridge 14 in unsnapping it from the last (see FIG. 2B), for instance in direction D1. When the adaptor 16 is completely separated from the shaving cartridge 14 (see FIG. 2C), the user can either change it by a new one (as disclosed above and in reference to FIG. 2D) or the user can reverse it and attach it onto the shaving cartridge 14 for instance as disclosed below.

The first opening 36A of the frame which was covering the cutting edges 22 as depicted on FIG. 2A is after having reversed the frame 34 on the shaving cartridge 14 covering the lower face 24D of the housing 24 (not depicted), whereas the second opening 38A which covered the lower face 24D of the housing 24 (see FIG. 6), covers now the shaving blades 20 after having reversed the frame 34 on the shaving cartridge 14 (see FIG. 2F). The first opening 36A of the adaptor 16 which was connected to the shaving cartridge 14 on the upper face 240 is after reversing connected to the lower face 24D of the housing, whereas the second opening 36B of the adaptor 16 which was connected to the shaving cartridge 14 on the lower face 24D is after reversing connected to the upper face 240 of the housing. Then, the user can bring the adaptor 16 close to the shaving cartridge 14, for instance from the upper side of the housing 24D (see FIG. 2E). The user can than snap-fit the adaptor 16 on the shaving cartridge 14 until complete attachment (see FIG. 2F). After that, the razor is ready again to be used with the shaving aids 32 for further shaving. More precisely, the shaving aids 32 of the razor which are now used for shaving on their second faces 32B.

We will know describe the method of using an adaptor attached on the shaving cartridge by sliding in reference to FIGS. 3A-3B. The adaptor of this embodiment is not reversible.

When the adaptor 16 is not reversible, only the first faces 32A of the shaving aids are used during shaving. Thus, when the first faces 32A of the shaving aids 32 are outworn, the user changes the adaptor 16 by a new one. As best depicted on FIG. 3B, the user detaches the adaptor 16, more precisely the frame 34, from the shaving cartridge 14 in sliding it from the last especially along arrow F1 and passing the shaving cartridge 14 through a first end opening 42A provided on the first end 42 of the frame 34; more precisely in sliding it along axis X-X. Of course, one user can also separate the adaptor 16 from the shaving cartridge 14 in sliding the last with regard to the adaptor 16 along arrow F2 (opposed to arrow F1); the user can also combine both movements (sliding the adaptor along F1 and sliding the shaving cartridge along F2). The first end opening 42A may be designed as depicted on the drawings to allow the sliding of the adaptor 16 with regard to the shaving cartridge 14 even when the last is connected to the handle body 12; this means that there is no need to detach the shaving cartridge 14 from the handle body 12 when sliding the adaptor 16 from the shaving cartridge 14. The adaptor 16 is preferably provided with a second end hole 44A on its second end 44 such that the sliding of the adaptor on the shaving cartridge 14 can be done easily without creating a vacuum effect.

When the adaptor is completely separated from the shaving cartridge 14 as depicted on FIG. 3B, the user can attach a new adaptor 16 for instance by sliding it along arrow F2 (opposed to arrow F1) in passing the shaving cartridge 14 through the first end opening 42A of the frame 34 (not illustrated); after that the user can shave with a razor as depicted on FIG. 3A. Of course, here again as for the separation of the adaptor from the shaving cartridge, one user can also attach the adaptor 16 onto the shaving cartridge 14 in sliding the last with regard to the adaptor 16 along arrow F1 in passing the shaving cartridge 14 through the first end opening 42A of the frame 34; the user can also combine both movements (sliding the adaptor along F2 and sliding the shaving cartridge along F1). As best seen on FIG. 3B, one or more bulges 50 can be provided on the frame 34 to allow the attachment and firmly maintain of the adaptor 16 onto the shaving cartridge 14 after the sliding occurred in order to be ready for shaving securely.

We will now describe the method of using another embodiment of an adaptor attached on the shaving cartridge by sliding in reference to FIGS. 4A-4H.

In this embodiment of this sliding adaptor, the adaptor 14 can be provided with a first end 42 and a second end 44 opposed to the first end 42 which have a U-shape as depicted on FIGS. 4A to 4H. In that case, there is no need of a second end hole as previously mentioned to avoid a vacuum effect since due to their shape in U the first end 42 and the second end 44 are provided with openings 42A and 44A allowing the passage of the shaving cartridge (by sliding). To attach the adaptor 16 on the shaving cartridge 14, the adaptor 16 is slid onto the shaving cartridge 14 either by its second end 44 (not illustrated) when using the first faces 32A of the shaving aid 32 (FIG. 4A) or by its first end 42 as depicted on FIG. 4F far instance, when using the second faces 32B of the shaving aid 32.

When the adaptor 16 is not reversible, only the first faces 32A of the shaving aids are used during shaving. Thus, when the first faces 32A of the shaving aids 32 are outworn, the user changes the adaptor 16 by a new one. As best depicted on FIG. 4B, the user detaches the adaptor 16, more precisely the frame 34, from the shaving cartridge 14 in sliding it from the last especially along arrow F1 and passing the shaving cartridge 14 through a first end opening 42A provided on the first end 42 of the frame 34; more precisely in sliding it along axis X-X. Of course, one user can also separate the adaptor 16 from the shaving cartridge 14 in sliding the last with regard to the adaptor 16 along arrow F2 (opposed to arrow F1); the user can also combine both movements (sliding the adaptor along F1 and sliding the shaving cartridge along F2). The first end opening 42A may be designed as depicted on the drawings to allow the sliding of the adaptor 16 with regard to the shaving cartridge 14 even when the last is connected to the handle body 12; this means that there is no need to detach the shaving cartridge 14 from the handle body 12 when sliding the adaptor 16 from the shaving cartridge 14. When the adaptor is completely separated from the shaving cartridge 14 as depicted on FIG. 4B, the user can attach a new adaptor 16 for instance by sliding along arrow F2 (opposed to arrow F1) in passing the shaving cartridge 14 through the first end opening 42A of the frame 34; after that the user can shave with a razor as depicted on FIG. 4A. Of course, here again as for the separation of the adaptor from the shaving cartridge, one user can also attach the adaptor 16 onto the shaving cartridge 14 in sliding the last with regard to the adaptor 16 along arrow F1 in passing the shaving cartridge 14 through the first end opening 42A of the frame 34; the user can also combine both movements (sliding the adaptor along F2 and sliding the shaving cartridge along F1).

As best seen on FIGS. 4B and 4F, one or more bulges 50 can be provided on the frame 34 to allow the attachment and firmly maintain of the adaptor 16 onto the shaving cartridge 14 after the sliding occurred in order to shave.

When such an adaptor is reversible, the user can reverse the frame 34 when the first faces 32A of the shaving aid 32 are outworn, such that the second faces 32B of the shaving aids 32 can be used during shaving. Actually, the user detaches the frame 34 from the shaving cartridge 14 in sliding it from the last (see FIG. 4B) along arrow F1 in passing the shaving cartridge 14 through the first end opening 42A of the frame 34; more precisely in sliding the frame 34 along axis X-X. When the adaptor is completely separated from the shaving cartridge 14 (see FIG. 4B), the user can reverse it in rotating/twisting it around axis X-X for instance (see FIGS. 4C to 4E). The first opening 36A of the frame which was covering the cutting edges 22 as depicted on FIG. 4A is after having reversed the frame 34 on the shaving cartridge 14 covering the lower part of the housing 24D (see FIG. 4H), whereas the second opening 38A which covered the upper face of the housing 24C (see FIG. 7), covers the shaving blades 20 after having reversed the frame 34 on the shaving cartridge 14 (see FIG. 4G). The first opening 36A of the adaptor 16 which was connected to the shaving cartridge 14 on the upper face 24C is after reversing connected to the lower face 24D of the housing, whereas the second opening 368 of the adaptor 16 which was connected to the shaving cartridge 14 on the lower face 24D is after reversing connected to the upper face 24C of the housing. The user can than slide the adaptor 16 on the shaving cartridge 14 (see FIG. 4F) until complete attachment (see FIG. 40). After that, the razor is ready again to be used with the shaving aids 32 for further shaving.

We will know describe the method of using an adaptor attached on the shaving cartridge by encasing (see FIGS. 5A-5B).

When the adaptor 16 is not reversible this means that only the first faces 32A of the shaving aids can be used during shaving. Thus, when the first faces 32A of the shaving aids 32 are outworn, the user changes the adaptor 16 by a new one. The adaptor is reversible, as depicted on FIGS. 5A and 5B, when each of the shaving aids 32 is provided with a first face 32A and a second face 32B, each of them being able to contact the skin during shaving. The frame 34 of the adaptor 16 comprises for instance two parts 34A and 34B linked pivotally together by a hinge 35. Opposed to that hinge 35, several tabs 33 can be provided on the frame 34 to secure the closure of the adaptor 16 as illustrated on FIG. 5A.

When the adaptor 16 is not reversible, only the first faces 32A of the shaving aids are used during shaving. Thus, when the first faces 32A of the shaving aids 32 are outworn, the user changes the adaptor 16 by a new one. As best depicted on FIG. 5B, the user opens the adaptor 16 in pivoting one part of the frame with regard to the other one about the hinge 35. The user can than attach a new adaptor 16 by encasing the shaving cartridge in it and shave with a razor 10 as depicted on FIG. 5A.

When such an adaptor is reversible, the user can reverse the frame 34 when the first faces 32A of the shaving aid 32 are outworn, such that the second faces 32B of the shaving aids 32 can be used during shaving. Actually, the user detaches the frame 34 from the shaving cartridge 14 in opening the hinge 35 (see FIG. 5B) and when the adaptor is completely separated from the shaving cartridge 14 (see FIG. 5B), the user can reverse it in rotating it around axis X-X for instance. The first opening 36A of the frame which was covering the cutting edges 22 as depicted on FIG. 5A is after having reversed the frame 34 on the shaving cartridge 14 covering the lower part of the housing 24D (not illustrated), whereas the second opening 38A which covered the lower face of the housing, covers the shaving blades 20 after having reversed the frame 34 on the shaving cartridge 14 (not illustrated). The first opening 36A of the adaptor 16 which was connected to the shaving cartridge 14 on the upper face 24C is after reversing connected to the lower face 24D of the housing, whereas the second opening 36B of the adaptor 16 which was connected to the shaving cartridge 14 on the lower face 24D is after reversing connected to the upper face 24C of the housing. After that, the razor is ready again to be used with the shaving aids 32 for further shaving.

Figure 8:
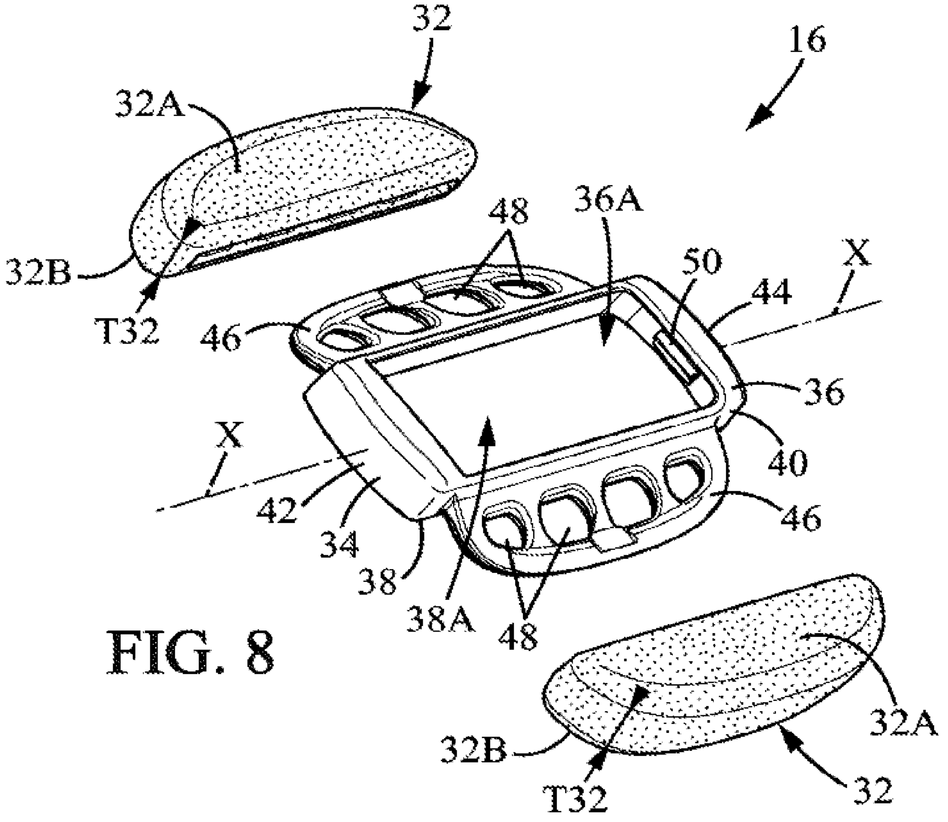
FIG. 8 is an exploded perspective view of the adaptor of the present invention.

Each of the above disclosed adaptors can be provided with shaving aid holders 46 which are unitary with the frame 34 or which are removably attached to the frame such disconnected from the frame 34 of the adaptor 16 as depicted for instance on FIG. 8. In this case, when the shaving aid 32 is outworn, the frame 16 can be maintained on the shaving cartridge 14 and the user can either remove the shaving aid holders 46 in order to change it by a new one or the user can reverse the shaving aid holders 46.

When discussing about reversibility, one should understand that it means that at least one of the shaving aid provided on the frame has two opposed faces each of which can successively be used during shaving in reversing the faces. This reverse of the two opposed faces 32A and 32B of one shaving aid 32 may be obtained in reversing the complete adaptor 16 (more precisely the frame 34) with regard to the shaving cartridge 14 and/or in reversing the holder 46 of the shaving aid 32 with regard to the frame 34. The reversibility of the adaptor (the frame and/or each shaving aid) is obtained especially by twisting or reversal.

The shaving aid 32 is preferably motionless with regard to the frame 34; this means that the holder 46 of the shaving aid 32 cannot move with regard to the frame 34 especially during shaving. However the present invention is not limited to this kind of embodiments and the shaving aid 32 can be movable with regard to the frame 34, for instance the holder 46 of the shaving aid 32 can flex and/or translate with regard to the frame 34.

The adaptor comprises preferably a material chosen among the plastic, like for instance thermoplastic like PP, PS and/or ABS.

The adaptor of the present invention can be provided with one or more bulges 50 on the frame 34 to allow the attachment and firmly maintain of the adaptor 16 onto the shaving cartridge 14 after the sliding occurred in order to shave securely (avoiding any risk of untimely detachment of the adaptor). Any other means can be provided to retain securely the adaptor on the shaving cartridge in order to avoid any risk of untimely detachment of the adaptor when shaving.

The reversibility of the adaptor of the present invention is obtained in pivoting/twisting/revolving the adaptor with regard to the shaving cartridge as disclosed above.

The invention claimed is:

1. An adaptor for a shaving cartridge comprising:

a frame extending along a plane that includes a longitudinal axis, the frame including a first side wall and a second side wall, the first side wall and the second side wall each including at least one bulge operable to couple the frame with the shaving cartridge; and a shaving aid coupled with the frame;

the adaptor being configured to be detachably coupled to the shaving cartridge such that the adaptor is reversibly mountable on the shaving cartridge perpendicular to the plane, wherein the adaptor reversibly mountable on the shaving cartridge perpendicular to the plane includes the adaptor being configured to be utilized in a first configuration where the shaving aid is located in front of a cutting edge of a blade in the shaving cartridge and in a second configuration where the shaving aid is located behind the cutting edge, wherein the shaving aid has a face that is utilized in both the first configuration and the second configuration, wherein the at least one bulge of the first side wall mirrors the at least one bulge of the second side wall with respect to a transverse axis that is transverse to the longitudinal axis.

2. The adaptor of claim 1, wherein the shaving aid is inseparable from the frame.

3. The adaptor of claim 1, wherein the frame has a first wall, a second wall opposite the first wall, and the first and second side walls extending from the first wall to the second wall; wherein the first wall has an opening; wherein the frame is mountable on the shaving cartridge such that the cutting edge of the blade in the shaving cartridge is uncovered and is accessible through the opening.

4. The adaptor of claim 1, wherein when the adaptor is reversibly mounted on the shaving cartridge, the cutting edge of the blade in the shaving cartridge is uncovered and is accessible through an opening of the frame of the adapter.

5. The adaptor of claim 1, wherein the adaptor is reversibly mountable on the shaving cartridge by snap fit.

6. The adaptor of claim 1, wherein the adaptor is reversibly mountable on the shaving cartridge by friction fit.

7. The adaptor of claim 1, wherein the shaving aid includes a lubricant, a moisturizer, a conditioner, and/or an exfoliant.

8. The adaptor of claim 1, wherein the at least one bulge on each of the first side wall and the second side wall are symmetrical with respect to a transverse plane that is perpendicular to the plane of the frame.

9. A shaving assembly comprising:

a shaving cartridge including a blade, the blade having a cutting edge extending along a longitudinal axis; and an adaptor for the shaving cartridge, the adaptor including:

a frame extending along a plane that includes the longitudinal axis, the frame including a first side wall and a second side wall, the first side wall and the second side wall each including at least one bulge operable to couple the frame with the shaving cartridge; and a shaving aid coupled with the frame;

the adaptor being configured to be detachably coupled to the shaving cartridge such that the adaptor is reversibly mountable on the shaving cartridge perpendicular to the plane, wherein the adaptor reversibly mountable on the shaving cartridge perpendicular to the plane includes the adaptor being configured to be utilized in a first configuration where the shaving aid is located in front of the cutting edge of the blade in the shaving cartridge and in a second configuration where the shaving aid is located behind the cutting edge, wherein the shaving aid has a face that is utilized in both the first configuration and the second configuration, wherein the at least one bulge of the first side wall mirrors the at least one bulge of the second side wall with respect to a transverse axis that is transverse to the longitudinal axis.

10. The shaving assembly of claim 9, wherein the shaving aid is inseparable from the frame.

11. The shaving assembly of claim 9, wherein the frame has a first wall, a second wall opposite the first wall, and the first and second side walls extending from the first wall to the second wall; wherein the first wall has an opening; wherein the frame is mountable on the shaving cartridge such that the cutting edge of the blade in the shaving cartridge is uncovered and is accessible through the opening.

12. The shaving assembly of claim 9, wherein when the adaptor is reversibly mounted on the shaving cartridge, the cutting edge of the blade in the shaving cartridge is uncovered and is accessible through an opening of the frame of the adaptor.

13. The shaving assembly of claim 9, wherein the adaptor is reversibly mountable on the shaving cartridge by snap fit.

14. The shaving assembly of claim 9, wherein the adaptor is reversibly mountable on the shaving cartridge by friction fit.

15. The shaving assembly of claim 9, wherein the shaving aid includes a lubricant, a moisturizer, a conditioner, and/or an exfoliant.

16. The shaving assembly of claim 9, wherein the at least one bulge on each of the first side wall and the second side wall are symmetrical with respect to a transverse plane that is perpendicular to the plane of the frame.

* * * * *